(12) United States Patent
Springs et al.

(10) Patent No.: US 9,518,229 B2
(45) Date of Patent: Dec. 13, 2016

(54) CATALYSTS FOR THERMO-CATALYTIC CONVERSION OF BIOMASS, AND METHODS OF MAKING AND USING

(71) Applicant: Inaeris Technologies, LLC, Pasadena, TX (US)

(72) Inventors: Jerry Jon Springs, League City, TX (US); Bruce ADkins, League City, TX (US); Stephen Schuyten, Houston, TX (US); Gopal Juttu, League City, TX (US); Christine M. Henry, Houston, TX (US); Kelsey Shogren, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 193 days.

(21) Appl. No.: 13/838,706

(22) Filed: Mar. 15, 2013

(65) Prior Publication Data

US 2014/0024866 A1 Jan. 23, 2014

Related U.S. Application Data

(60) Provisional application No. 61/674,057, filed on Jul. 20, 2012.

(51) Int. Cl.
| | |
|---|---|
| *B01J 29/06* | (2006.01) |
| *C10G 1/08* | (2006.01) |
| *B01J 29/40* | (2006.01) |
| *B01J 29/18* | (2006.01) |
| *B01J 29/65* | (2006.01) |
| *B01J 29/08* | (2006.01) |
| *B01J 29/70* | (2006.01) |
| *B01J 37/28* | (2006.01) |
| *B01J 35/10* | (2006.01) |
| *B01J 37/00* | (2006.01) |
| *B01J 35/00* | (2006.01) |

(52) U.S. Cl.
CPC .............. *C10G 1/086* (2013.01); *B01J 29/084* (2013.01); *B01J 29/18* (2013.01); *B01J 29/40* (2013.01); *B01J 29/65* (2013.01); *B01J 29/7007* (2013.01); *B01J 37/0018* (2013.01); *B01J 37/28* (2013.01); *C10G 1/08* (2013.01); *B01J 35/0026* (2013.01); *B01J 35/108* (2013.01); *B01J 35/1019* (2013.01); *B01J 35/1033* (2013.01); *B01J 35/1038* (2013.01); *B01J 35/1061* (2013.01); *B01J 35/1085* (2013.01); *B01J 37/0045* (2013.01); *B01J 2229/42* (2013.01); *C10G 2300/1011* (2013.01); *C10G 2300/1014* (2013.01); *Y02P 30/20* (2015.11)

(58) Field of Classification Search
USPC ....................... 502/64, 70, 71, 77
See application file for complete search history.

(56) References Cited

U.S. PATENT DOCUMENTS

| | | | |
|---|---|---|---|
| 2,727,008 A | 12/1955 | Her | |
| 3,617,524 A | 11/1971 | Conn | |
| 3,752,772 A | 8/1973 | Horzepa | |
| 3,843,741 A | 10/1974 | Yan | |
| 3,867,308 A * | 2/1975 | Elliott, Jr. ....................... | 502/65 |
| 3,926,783 A | 12/1975 | Wolk | |
| 3,965,043 A | 6/1976 | Stridde | |
| 4,238,364 A | 12/1980 | Shabtai | |
| 4,356,113 A | 10/1982 | Lim et al. | |
| 4,409,092 A | 10/1983 | Johnson et al. | |
| 4,420,644 A | 12/1983 | Huibers et al. | |
| 4,423,299 A | 12/1983 | Gurol et al. | |
| 4,440,868 A * | 4/1984 | Hettinger et al. .............. | 502/65 |
| 4,483,764 A | 11/1984 | Hensley et al. | |
| 4,584,091 A | 4/1986 | Pine | |
| 4,601,997 A | 7/1986 | Speronello | |
| 4,968,650 A | 11/1990 | Chu et al. | |
| 4,987,114 A | 1/1991 | Suzukamo et al. | |
| 5,171,921 A | 12/1992 | Gaffney et al. | |
| 5,190,902 A * | 3/1993 | Demmel ......................... | 502/63 |
| 5,194,412 A * | 3/1993 | Roberie et al. ................. | 502/64 |
| 5,231,064 A * | 7/1993 | Absil et al. ..................... | 502/68 |
| 5,288,739 A | 2/1994 | Demmel | |
| 5,380,690 A | 1/1995 | Zhicheng et al. | |
| 5,456,821 A * | 10/1995 | Absil et al. ................... | 208/114 |
| 5,536,852 A | 7/1996 | Matsui et al. | |

(Continued)

FOREIGN PATENT DOCUMENTS

| | | |
|---|---|---|
| CN | 1608972 | 4/2005 |
| EP | 0187007 | 7/1986 |

(Continued)

OTHER PUBLICATIONS

McKEndry, P.; "Energy Production from Biomass (part 1); overview of Biomass" Bioresource Technology, 83(1): 37-46 (May 2002).

(Continued)

*Primary Examiner* — Elizabeth Wood

(74) *Attorney, Agent, or Firm* — Dunlap Codding, P.C.

(57) ABSTRACT

Disclosed are catalyst compositions including zeolite and silica components, methods of making, and processes of using in the thermo-catalytic conversion of biomass. Such disclosed methods of making include: i) spray drying of the catalyst precursor slurry at a pH below 1, or ii) the removal of ions such as sodium from the binder material prior to spray drying the catalyst precursor slurry at a pH below 2.7, or iii) spray drying the catalyst precursor including a pore regulating agent followed by steam treating, or iv) some combination of i), ii) and iii).

13 Claims, 20 Drawing Sheets

(56) References Cited

U.S. PATENT DOCUMENTS

| | | | |
|---|---|---|---|
| 5,545,599 | A | 8/1996 | Pickering et al. |
| 5,958,818 | A | 9/1999 | Demmel |
| 6,103,949 | A | 8/2000 | Demmel et al. |
| 6,395,949 | B1 | 5/2002 | Drake et al. |
| 6,436,279 | B1 | 8/2002 | Colyar |
| 6,479,421 | B1 | 11/2002 | Vierheilig |
| 6,556,293 | B2 | 4/2003 | Savareigo |
| 6,566,293 | B1 | 5/2003 | Vogt et al. |
| 6,776,899 | B2 | 8/2004 | Lam et al. |
| 6,835,863 | B2 | 12/2004 | Chester et al. |
| 6,995,108 | B1 | 2/2006 | Flessner |
| 7,035,285 | B2 | 4/2006 | Holloway et al. |
| 7,217,676 | B2 | 5/2007 | Rodriguez et al. |
| 7,304,194 | B2 | 12/2007 | Ghosh et al. |
| 7,344,695 | B2 | 3/2008 | Xu et al. |
| 7,375,048 | B2 * | 5/2008 | Smith et al. ............ 502/64 |
| 7,431,825 | B2 | 10/2008 | Vierheilig et al. |
| 7,442,664 | B2 * | 10/2008 | Van Der Zon et al. ........ 502/63 |
| 7,517,827 | B2 | 4/2009 | Ravichandran et al. |
| 8,022,260 | B2 | 9/2011 | O'Connor et al. |
| 2003/0047487 | A1 * | 3/2003 | Ziebarth et al. ......... 208/120.01 |
| 2004/0110629 | A1 | 6/2004 | Stamires et al. |
| 2004/0111968 | A1 | 6/2004 | Day et al. |
| 2004/0151664 | A1 | 8/2004 | Auner |
| 2007/0173399 | A1 * | 7/2007 | Lau et al. ............ 502/60 |
| 2008/0058563 | A1 | 3/2008 | Dumesic et al. |
| 2008/0093263 | A1 * | 4/2008 | Cheng et al. ............ 208/114 |
| 2008/0210600 | A1 | 9/2008 | O'Connor et al. |
| 2008/0216391 | A1 | 9/2008 | Cortright et al. |
| 2009/0019770 | A1 | 1/2009 | Nacken et al. |
| 2009/0023971 | A1 | 1/2009 | Smith |
| 2009/0090046 | A1 | 4/2009 | O'Connor et al. |
| 2009/0098032 | A1 | 4/2009 | Yang et al. |
| 2009/0227823 | A1 | 9/2009 | Huber et al. |
| 2009/0308787 | A1 | 12/2009 | O'Connor et al. |
| 2010/0010279 | A1 * | 1/2010 | Kumar ............ 585/653 |
| 2010/0105970 | A1 | 4/2010 | Yanik et al. |
| 2010/0152024 | A1 | 6/2010 | Stamires et al. |
| 2010/0209965 | A1 | 8/2010 | O'Connor et al. |
| 2010/0298126 | A1 | 11/2010 | DeGraaf et al. |
| 2010/0298129 | A1 | 11/2010 | Liang et al. |
| 2011/0011721 | A1 | 1/2011 | Champagne |
| 2011/0167713 | A1 | 7/2011 | Quignard et al. |
| 2012/0117860 | A1 | 5/2012 | Brady et al. |
| 2012/0142520 | A1 | 6/2012 | Bartek et al. |
| 2012/0232299 | A1 | 9/2012 | Bartek et al. |
| 2013/0000183 | A1 | 1/2013 | Adkins et al. |
| 2013/0023710 | A1 | 1/2013 | Ravichandran et al. |
| 2013/0197291 | A1 | 8/2013 | Nesterenko et al. |
| 2013/0261355 | A1 | 10/2013 | Stamires |
| 2014/0007493 | A1 | 1/2014 | Henry et al. |
| 2014/0024866 | A1 | 1/2014 | Springs et al. |

FOREIGN PATENT DOCUMENTS

| | | |
|---|---|---|
| EP | 1852466 | 11/2004 |
| EP | 1852490 | 11/2007 |
| EP | 2017003 | 1/2009 |
| EP | 2105486 | 9/2009 |
| EP | 2107100 | 10/2009 |
| WO | WO00134295 | 11/2000 |
| WO | WO2004020093 | 3/2004 |
| WO | WO2007128799 | 11/2007 |
| WO | WO2008009643 | 1/2008 |
| WO | WO2008061305 | 5/2008 |
| WO | WO2010012564 | 2/2010 |
| WO | WO2010062936 | 6/2010 |
| WO | WO2010065872 | 6/2010 |
| WO | WO2010111396 | 9/2010 |
| WO | WO2010123961 | 10/2010 |
| WO | WO2010124069 | 10/2010 |
| WO | WO2010129170 | 11/2010 |
| WO | WO2010135734 | 11/2010 |
| WO | WO2012122245 | 9/2012 |

OTHER PUBLICATIONS

Wyman, et al.; "Coordinated Development of Leading Biomass Pretreatment Technologies" Bioresource Technology, 96(18): 1959-1966, (Dec. 2005).

Lappas, et al.; "Design, Construction, and Operation of a Transported Fluid Bed Process Development Unit for Biomass Fast Pyrolysis : Effect of Pyrolysis Temperature," Ind. Eng. Chem. Res., 47:742-747 (2000).

Samolada et al.; "Catalyst Evaluation for Catalytic Biomass Pyrolysis," Energy & Fuels, 14:1161-1167 (2000).

Lappas "Biomass pyrolysis in a circulating fluid bed reactor for the production of fuels and chemicals" Fuel 81:2087-2095, 2002.

Yuandong, et al.; "Recent Advances in Heavy Oil Hydroprocessing Technologies" Recent Patents on Chemical Engineering 2009, 2:22-36.

Aho, A, et al.; "Pyrolysis of Softwood Carbohydrates in a Fluidized Bed Reactor" Int J Mol.Sci Sep. 2008; 9(9): 1665-1675.

International Search Report for PCT Application No. PCT/US2013/51374; Filed on Jul. 9, 2013; dated Nov. 13, 2013; 4 pages.

Viswanathan et al., "Surface properties of ZSM-5 modified by phosphorous," Catalysis Letters 22 1993, pp. 373-79.

CCPIT Office Action for Application No. 201380044791.1; Published May 6, 2015; dated Feb. 2, 2016.

European Search Report for Application No. 13819485.7; Published May 27, 2015; dated Feb. 12, 2016.

* cited by examiner

CATALYSTS FOR THERMO-CATALYTIC CONVERSION OF BIOMASS, AND METHODS OF MAKING AND USING

CROSS REFERENCE TO RELATED APPLICATIONS/INCORPORATION BY REFERENCE STATEMENT

The present application claims the benefit under 35 U.S.C. 119(e) of U.S. Provisional Application No. 61/674,057, filed Jul. 20, 2012, the entirety of which is hereby expressly incorporated herein by reference.

FIELD OF THE INVENTION

The presently disclosed and claimed inventive process(es), procedure(s), method(s), product(s), result(s) and/or concept(s) (collectively hereinafter referenced to as the "presently disclosed and claimed inventive concept(s)") relates generally to zeolite-containing catalysts for use in catalytic cracking processes, and more particularly, to methods of making and processes for using such catalysts in the thermo-catalytic conversion of biomass to bio-oil.

DESCRIPTION OF THE RELATED ART

With the rising costs and environmental concerns associated with fossil fuels, renewable energy sources have become increasingly important, and in particular, the production of renewable transportation fuels from the conversion of biomass feedstocks. Many different processes have been, and are being, explored for the conversion of biomass to biofuels and/or specialty chemicals. Some of the existing biomass conversion processes include, for example, combustion, gasification, slow pyrolysis, fast pyrolysis, liquefaction, and enzymatic conversion. The conversion products produced from these processes tend to be of low quality, containing high amounts of water and highly oxygenated hydrocarbonaceous compounds, making them difficult to separate into aqueous and hydrocarbonaceous phases. Also, these products usually require extensive secondary upgrading in order to be useful as transportation fuels.

Bio-oils produced from the thermo-catalytic conversion of biomass tend to be of better quality, with hydrocarbonaceous compounds having relatively low oxygen content, and which are generally separable by gravity separation into aqueous and hydrocarbonaceous phases.

While the use of conventional cracking catalysts, such as zeolite-containing FCC cracking catalysts, in the thermo-catalytic conversion of biomass can result in bio-oil products of superior quality to those produced from straight pyrolysis of biomass, such conventional catalytic systems can still suffer from insufficiently low yields, lower but still insufficiently high bio-oil oxygen levels, and elevated coke make.

Accordingly, there remains a need for an improved catalyst for the thermo-catalytic conversion of biomass which results in higher bio-oil yields, lower bio-oil oxygen levels, and lower coke make.

SUMMARY OF THE INVENTION

In accordance with an embodiment of the presently disclosed and claimed inventive concept(s), a biomass conversion catalyst in the form of particles is provided comprising: silica, clay, and a zeolite; wherein the particles have: i) an average pore volume of pores ranging in diameter from about 80 to about 600 Å of at least about 0.025 cm$^3$/g, and ii) an average pore volume of pores ranging in diameter from about 20 to about 80 Å of no more than about 0.08 cm$^3$/g; wherein each of the average pore volumes in i) and ii) are obtained from the adsorption branch of the nitrogen isotherm, when measured per ASTM method D4222 at about 77° K, and discretized according to the BJH pore size distribution model.

In accordance with another embodiment, a method of making a biomass conversion catalyst is provided and comprises:
  a) preparing an aqueous slurry comprising a zeolite and a silica precursor; and
  b) spray drying the aqueous slurry at a pH equal to or less than about 1, thereby gelling the silica precursor and forming the biomass conversion catalyst into particles.

In accordance with another embodiment, a biomass conversion catalyst in the form of particles is provided and comprises: silica, clay, and a zeolite; wherein the particles have an average mesopore surface area (average MSA) less than or equal to about 50 m$^2$/g, and wherein the biomass conversion catalyst has a salt concentration less than about 0.1 times the mass of the silica.

In accordance with another embodiment, the biomass conversion catalyst particles in the previously described embodiment can have: i) an average pore volume of pores ranging in diameter from about 80 to about 600 Å of at least about 0.01 cm$^3$/g, and ii) an average pore volume of pores ranging in diameter from about 20 to about 80 Å of no more than about 0.03 cm$^3$/g; wherein each of the average pore volumes in i) and ii) are obtained from the adsorption branch of the nitrogen isotherm, when measured per ASTM method D4222 at about 77° K, and discretized according to the BJH pore size distribution model.

In accordance with another embodiment, a method of making a biomass conversion catalyst is provided and comprises:
  a) preparing an aqueous slurry comprising a zeolite, and a silica precursor which is substantially sodium free; and
  b) spray drying the aqueous slurry at a pH equal to or less than about 2.7, or equal to or less than about 1, thereby gelling the silica precursor and forming the biomass conversion catalyst into particles; wherein the particles have an average mesopore surface area (average MSA) less than or equal to about 50 m$^2$/g, and wherein the biomass conversion catalyst has a salt concentration less than about 0.1 times the mass of the silica.

In accordance with another embodiment, a method of making a biomass conversion catalyst is provided and comprises:
  a) preparing an aqueous slurry comprising a zeolite, a silica precursor which is substantially sodium free, and a pore regulating agent;
  b) spray drying the aqueous slurry thereby gelling the silica precursor and forming particles;
  c) removing substantially all of the pore regulating agent from the particles; and
  d) steam treating the particles following step c) thereby forming the biomass conversion catalyst; wherein the biomass conversion catalyst has a salt concentration less than about 0.1 times the mass of the silica.

In accordance with another embodiment, a process for the conversion of particulate biomass is provided comprising: contacting the particulate biomass with any of the above described biomass conversion catalysts at temperatures ranging from about 200 to about 1000° C., and in the substantial absence of oxygen.

DETAILED DESCRIPTION OF THE INVENTION

Figure 1:
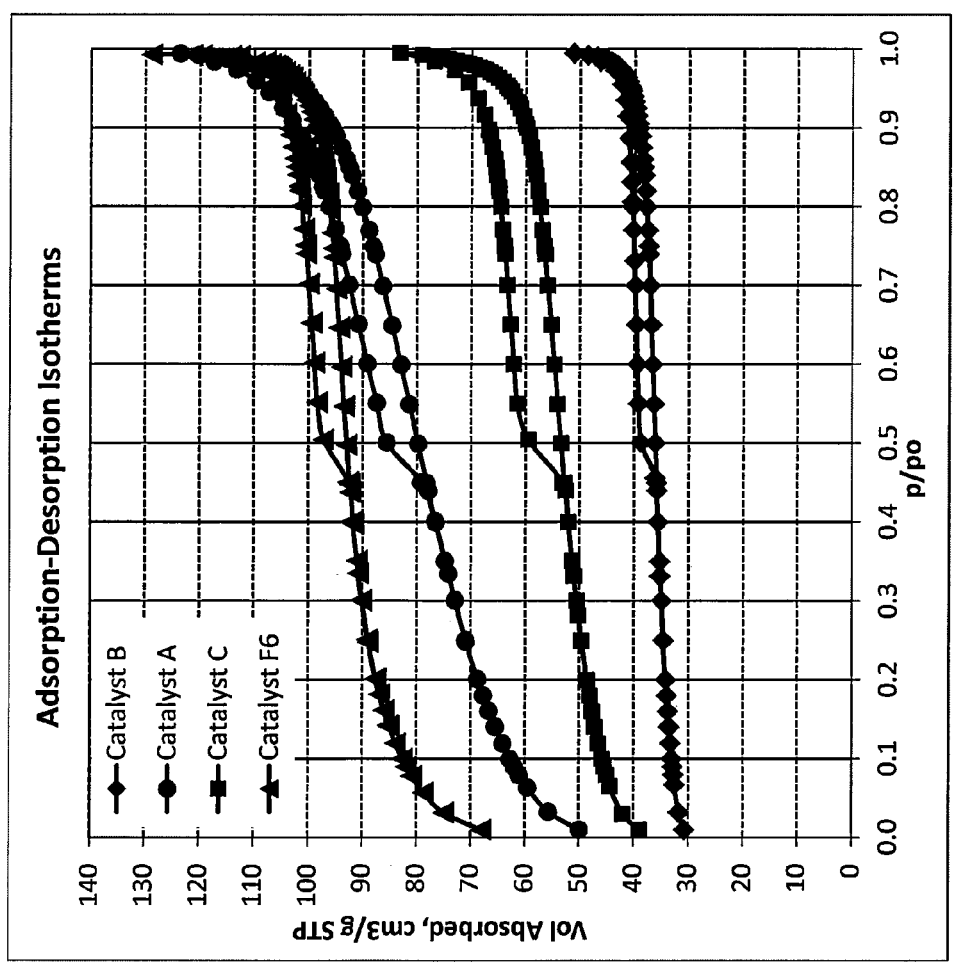
FIG. 1 is a plot of Nitrogen Adsorption-Desorption Isotherms for samples of Catalysts A, B, C and F6.

Before explaining at least one embodiment of the inventive concept(s) disclosed herein in detail, it is to be understood that the presently disclosed and claimed inventive concept(s), process(es), methodology(ies) and/or outcome(s) is not limited in its application to the details of construction and the arrangement of the components or steps or methodologies set forth in the following description or illustrated in the drawings. The presently disclosed and claimed inventive concept(s), process(es), methodology(ies) and/or outcome(s) disclosed herein is/are capable of other embodiments or of being practiced or carried out in various ways. Also, it is to be understood that the phraseology and terminology employed herein is for the purpose of description and should not be regarded as limiting the presently disclosed and claimed inventive concept(s), process(es), methodology(ies) and/or outcome(s) herein in any way. All terms used herein are intended to have their ordinary meaning unless otherwise provided.

Substantially sodium free as used herein to describe a silica precursor can mean the silica precursor either contains no sodium or can contain less than 1; or less than 0.1 wt % Na, on a dry basis.

Hydrothermal deactivation refers generally to the deactivation of a catalyst upon exposure to elevated temperatures (such as those described herein for biomass conversion) in the presence of water. More particularly, hydrothermal deactivation can be by a method selected from the group consisting of: i) steam treating the particles prior to use in biomass conversion, ii) hydrothermal deactivation of the particles during use in biomass conversion (in the presence of water), and iii) both i) and ii).

Catalysts

The biomass conversion catalyst(s) described in the embodiments below can be in the form of particles and can comprise, consist of, or consist essentially of silica, clay, and a zeolite. Such zeolites can be selected from the group consisting of ZSM-5, mordenite, beta, ferrierite, and zeolite-Y. The biomass conversion catalyst(s) can also further be promoted with phosphorous. The zeolite can also be a phosphorous promoted zeolite, such as a phosphorous promoted ZSM-5.

The clay can be any clay suitable for use in a catalyst, and more specifically, can be kaolin. The biomass conversion catalyst(s) can also be free of or substantially free of amorphous alumina. In addition, the biomass conversion catalyst(s) can have a Davison Attrition Index less than about 3, and can have an apparent bulk density greater than about 0.78 g/ml.

In accordance with an embodiment of the presently disclosed and claimed inventive concept(s), the particles of such biomass conversion catalyst(s) can have: i) an average pore volume of pores ranging in diameter from about 80 to about 600 Å of at least about 0.025 $cm^3/g$, or at least about 0.045 $cm^3/g$, and ii) an average pore volume of pores ranging in diameter from about 20 to about 80 Å of no more than about 0.08 $cm^3/g$, or no more than about 0.03 $cm^3/g$.

Each of the average pore volumes in i) and ii) can be obtained from the adsorption branch of the nitrogen isotherm, when measured per ASTM method D4222 at about 77° K, and discretized according to the BJH pore size distribution model. Each of the average pore volumes in i) and ii) above do not include any pore volume attributable to the zeolite.

The average pore volume of pores ranging in diameter from about 80 to about 600 Å of the particles of this embodiment can increase with increasing extent of hydrothermal deactivation of the particles. Also, the average pore volume of pores ranging in diameter from about 20 to about 80 Å of such particles decreases with increasing extent of hydrothermal deactivation of the particles.

In addition, the coke selectivity of such particles, when the particles are used in the thermocatalytic conversion of biomass as described above, decreases with increasing extent of hydrothermal deactivation of the particles up to the point where the hydrothermal deactivation of the particles stabilizes.

The biomass conversion catalyst(s) of this embodiment, as a result of the changes to the average pore volumes after hydrothermal deactivation, exhibit higher equilibrium deoxygenation activity than catalysts of substantially the same zeolite activity which do not experience these same pore volume changes after hydrothermal deactivation. More specifically, the biomass conversion catalyst(s) of this embodiment, as a result of the increase in average pore volume of pores ranging in diameter from about 80 to about 600 Å after hydrothermal deactivation, exhibit a higher equilibrium deoxygenation activity than catalysts of substantially the same zeolite activity which do not experience the same increase in average pore volume of pores ranging in diameter from about 80 to about 600 Å after hydrothermal deactivation.

The biomass conversion catalyst(s) of this embodiment can be prepared by a method comprising:
  a) preparing an aqueous slurry comprising a zeolite and a silica precursor; and
  b) spray drying the aqueous slurry at a pH equal to or less than about 1, thereby gelling the silica precursor and forming the biomass conversion catalyst(s) into particles.

The aqueous slurry can further comprise a clay, and the silica precursor can be selected from the group consisting of silicic acid, polysilicic acid, and combinations thereof. Following the spray drying of step b), the biomass conversion catalyst(s) of this embodiment can be promoted with phosphorous.

Consistent with the description above, prior to step a), a ZSM-5 material can be treated with a phosphorous-containing compound to form a phosphorous promoted ZSM-5 which can be used as the zeolite in the aqueous slurry. Such phosphorous promotion of either the biomass conversion catalyst(s) following spray drying or the ZSM-5 material can be through wet impregnation with an aqueous solution comprising a phosphorous-containing compound.

In accordance with this embodiment, the biomass conversion catalyst(s) can be prepared by a method comprising:
  a) preparing an aqueous slurry comprising a zeolite, a silica precursor which is substantially sodium free, and a pore regulating agent;
  b) spray drying the aqueous slurry thereby gelling the silica precursor and forming particles;
  c) removing substantially all of the pore regulating agent from the particles; and
  d) steam treating the particles following step c) thereby forming the biomass conversion catalyst; wherein the biomass conversion catalyst has a salt concentration less than about 0.1 times the mass of the silica.

The aqueous slurry can further comprise a clay, which can be kaolin; the zeolite can be ZSM-5; and the silica precursor can be selected from the group consisting of silicic acid, polysilicic acid, and combinations thereof. The spray drying of step b) can be at a pH equal to or less than about 2.7, or equal to or less than about 1. The biomass conversion catalyst(s) of this embodiment can also be free of or substantially free of amorphous alumina.

The pore regulating agent can be selected from the group consisting of an ionic pore regulating agent, a nonionic pore regulating agent, or combinations thereof. The ionic pore regulating agent can be selected from, but is not limited to, tetrasodium pyrophosphate, monoammonium phosphate, ammonium nitrate, ammonium sulfate, etc. The nonionic pore regulating agent can be selected from, but is not limited to, sucrose, maltodextrin, etc. The pore regulating agent can be added to the aqueous slurry just prior to the spray drying of step b). The pore regulating agent can be removed from the particles by a method including, but not limited to, washing with an aqueous solution, combustion (for organic PRA's), thermal decomposition, and combinations thereof.

Following the steam treating of step d), the biomass conversion catalyst(s) of this embodiment can be promoted with phosphorous. Consistent with the description above, prior to step a), a ZSM-5 material can be treated with a phosphorous-containing compound to form a phosphorous promoted ZSM-5 which can be used as the zeolite in the aqueous slurry. Such phosphorous promotion of either the biomass conversion catalyst(s) following steam treatment or of the ZSM-5 material can be through wet impregnation with an aqueous solution comprising a phosphorous-containing compound.

In accordance with an embodiment of the presently disclosed and claimed inventive concept(s), the particles of the biomass conversion catalyst(s) can have an average mesopore surface area (average MSA) less than or equal to about 50 $m^2/g$, or less than or equal to about 25 $m^2/g$, and the biomass conversion catalyst(s) can have a salt concentration less than about 0.1, or less than about 0.01, times the mass of silica present in the catalyst.

Such biomass conversion catalyst particles of this embodiment can have: i) an average pore volume of pores ranging in diameter from about 80 to about 600 Å of no more than about 0.020, or no more than about 0.018, or no more than about 0.015 $cm^3/g$, and ii) an average pore volume of pores ranging in diameter from about 20 to about 80 Å of no more than about 0.010 $cm^3/g$, or no more than about 0.008 $cm^3/g$; wherein each of the average pore volumes in i) and ii) are obtained from the adsorption branch of the nitrogen isotherm, when measured per ASTM method D4222 at about 77° K, and discretized according to the BJH pore size distribution model. Each of the average pore volumes in i) and ii) above do not include any pore volume attributable to the zeolite.

For the biomass conversion catalyst(s) particles of this embodiment, a) the average pore volume of pores ranging in diameter from about 80 to about 600 Å, and b) the average pore volume of pores ranging in diameter from about 20 to about 80 Å, each separately remain substantially constant with exposure to hydrothermal deactivation conditions over time. Also, the coke selectivity of such particles, when such particles are used in the thermocatalytic conversion of biomass, remains substantially constant with exposure to hydrothermal deactivation conditions over time.

The rate of change in deoxygenation activity of such particles of the biomass conversion catalyst(s) of this invention is less than the rate of change in deoxygenation activity of catalysts of substantially the same zeolite activity which, with exposure to hydrothermal deactivation conditions over time, do not experience the same stability in: a) average pore volume of pores ranging in diameter from about 80 to about 600 Å, and b) average pore volume of pores ranging in diameter from about 20 to about 80 Å.

The biomass conversion catalyst(s) of this embodiment can be prepared by a method comprising:
  a) preparing an aqueous slurry comprising a zeolite, and a silica precursor which is substantially sodium free; and b) spray drying the aqueous slurry at a pH equal to or less than about 2.7, or at a pH in the range of from about 2.0 to about 2.5, thereby gelling the silica precursor and forming the biomass conversion catalyst into particles.

Prior to step a) above, a silicon-containing compound comprising sodium salt-precursors can be subjected to ion exchange wherein at least a portion of the sodium salt-precursors can be removed, thereby forming the silica precursor. The aqueous slurry can further comprise a clay, and the silica precursor can be selected from the group consisting of silicic acid, polysilicic acid, and combinations thereof. Following the spray drying of step b), the biomass conversion catalyst(s) of this embodiment can be promoted with phosphorous.

Consistent with the description above, prior to step a), a ZSM-5 material can be treated with a phosphorous-containing compound to form a phosphorous promoted ZSM-5 which can be used as the zeolite in the aqueous slurry. Such phosphorous promotion of either the biomass conversion catalyst(s) after spray drying or of the ZSM-5 material can be through wet impregnation with an aqueous solution comprising a phosphorous-containing compound.

In accordance with this embodiment, the particles of the biomass conversion catalyst(s) can have an average MSA less than or equal to about 50 $m^2/g$, or less than or equal to about 25 $m^2/g$, and the biomass conversion catalyst(s) can have a salt concentration less than about 0.1, or less than about 0.01, times the mass of silica present in the catalyst. Also, such particles of the biomass conversion catalyst(s) of this embodiment can have: i) an average pore volume of pores ranging in diameter from about 80 to about 600 Å of at least about 0.01 $cm^3/g$, or at least about 0.015 $cm^3/g$, and ii) an average pore volume of pores ranging in diameter from about 20 to about 80 Å of no more than about 0.03 $cm^3/g$, or no more than about 0.025 $cm^3/g$; wherein each of the average pore volumes in i) and ii) are obtained from the adsorption branch of the nitrogen isotherm, when measured per ASTM method D4222 at about 77° K, and discretized according to the BJH pore size distribution model. Each of the average pore volumes in i) and ii) above do not include any pore volume attributable to the zeolite.

The biomass conversion catalyst(s) of this embodiment can be prepared by a method comprising:
a) preparing an aqueous slurry comprising a zeolite, and a silica precursor which is substantially sodium free; and
b) spray drying the aqueous slurry at a pH equal to or less than about 1, or equal to or less than about 0.5, thereby gelling the silica precursor and forming the biomass conversion catalyst into particles.

Prior to step a) above, a silicon-containing compound comprising sodium salt-precursors can be subjected to ion exchange wherein at least a portion of the sodium salt-precursors can be removed, thereby forming the silica precursor. The aqueous slurry can further comprise a clay, and the silica precursor can be selected from the group consisting of silicic acid, polysilicic acid, and combinations thereof. Following the spray drying of step b), the biomass conversion catalyst(s) of this embodiment can be promoted with phosphorous.

Consistent with the description above, prior to step a), a ZSM-5 material can be treated with a phosphorous-containing compound to form a phosphorous promoted ZSM-5 which can be used as the zeolite in the aqueous slurry. Such phosphorous promotion of either the biomass conversion catalyst(s) after spray drying or of the ZSM-5 material can be through wet impregnation with an aqueous solution comprising a phosphorous-containing compound.

In each of the previous catalyst preparation embodiments, any suitable acid can be used to adjust the pH to the desired level, and can include sulfuric or nitric acid.

Biomass Conversion

The biomass material useful in the invention described herein can be any biomass capable of being converted to liquid and gaseous hydrocarbons.

Preferred are solid biomass materials comprising a cellulosic material, in particular lignocellulosic materials, because of the abundant availability of such materials, and their low cost. The solid biomass feed can comprise components selected from the group consisting of lignin, cellulose, hemicelluloses, and combinations thereof. Examples of suitable solid biomass materials include forestry wastes, such as wood chips and saw dust; agricultural waste, such as straw, corn stover, sugar cane bagasse, municipal waste, in particular yard waste, paper, and card board; energy crops such as switch grass, coppice, eucalyptus; and aquatic materials such as algae; and the like.

The biomass can be thermo-catalytically converted at elevated temperatures. In particular, the biomass can be converted in a conversion reactor containing any of the above described biomass conversion catalyst(s) to thereby produce a conversion reactor effluent comprising vapor conversion products and the catalyst. The conversion reactor effluent can also include unreacted biomass, coke, or char. The vapor conversion products comprise, consist of, or consist essentially of bio-oil and water. The conversion reactor can be operated at a temperature in the range of from about 200° C. to about 1000° C., or between about 250° C. and about 800° C. The conversion reactor can also be operated in the substantial absence of oxygen.

At least a portion of the vapor conversion products can be separated from the conversion reactor effluent, and at least a portion of the vapor conversion products thus separated can be condensed to form a condensate comprising bio-oil and water. The condensate is generally separable by gravity separation into the bio-oil and into an aqueous phase comprising water.

Optionally, at least a portion of the bio-oil can be separated from the condensate, also forming the aqueous phase comprising water and less than about 25 wt %, or less than about 15 wt % hydrocarbonaceous compounds. Such separation can be by any method capable of separating bio-oil from an aqueous phase, and can include, but is not limited to, centrifugation, membrane separation, gravity separation, and the like. Preferably, if separated, the condensate is separated by gravity separation in a settling vessel into the bio-oil and into the aqueous phase. The oxygen levels of the produced bio-oils can be less than about 20 wt % on a dry basis, or between about 4 to about 18 wt % on a dry basis.

EXAMPLES

ZSM-5 Slurry Preparation

ZSM-5 powder was slurried in water at 35% solids.
ZSM-5 Phosphorous Pretreatment (P-ZSM-5 Preparation)

Aqueous $H_3PO_4$ (56-85 wt % on a dry $H_3PO_4$ basis) was added to some of the ZSM-5 slurry. The components were mixed for 5 minutes and pH was checked to be in the range of 1.8-2.5.

The pH of the slurry was adjusted to pH 4.0±0.2 with ammonium hydroxide solution ($NH_4OH$ 29 wt %). For example, for a 50 kg batch size about 1.3 kg NH$_4$OH was used. The slurry was mixed for 15 minutes, and the final slurry density was about 1.2 g/ml. The slurry was spray dried, and the resulting phosphated powder was calcined at 600° C. for about 4 hours in a muffle furnace. The calcined P-ZSM-5 contained about 9 wt % P$_2$O$_5$, based on the dry basis weight of the ZSM-5.

The calcined P-ZSM-5 was re-slurried in water at 35% solids and thoroughly milled and dispersed using a bead mill, forming a P-ZSM-5 slurry. The D50 was less than about 3.5 μm. The D90 was less than about 10 μm. The temperature was controlled so as not to exceed 55° C.

Binder Preparation (Concentrated Silicic Acid—CSA)

A 16.1 kg quantity of diluted water glass (DWG) was prepared by adding 8.3 kg of sodium silicate to 7.8 kg of a water and ice mixture. The DWG had a density of about 1.2 g/cc at 10° C.

An 8 kg quantity of diluted sulfuric acid (DSA) was prepared by adding 4.8 kg of sulfuric acid (50 wt %) to 3.2 kg of a water and ice mixture. The DSA had a density of about 1.2 g/cc at 5° C.

A quantity of a concentrated silicic acid solution (CSA) was prepared by the controlled combination of quantities of the DWG and the DSA. The flow rates of each component to the mix chamber were controlled such that the resulting pH of the CSA was about 1.8. The density of the CSA produced was about 1.2 g/cc.

Binder Preparation (Polysilicic Acid—PSA)

A 20 kg quantity of a 20 wt % sodium silicate solution was prepared by diluting a quantity of sodium silicate (29 wt %) with sufficient deionized water.

The sodium silicate solution was contacted with ion exchange resin beads to exchange the sodium ions of the sodium silicate with H$^+$ ions on the beads. The resulting PSA solution was substantially sodium free. The resulting pH of the PSA binder solution was about 1.4.

Example 1

Catalyst A Preparation

A quantity of water and a 20.8 kg quantity of the CSA binder solution (silica dry weight of 2.6 kg) were added to a mix tank.

In a separate container, a 16 gram quantity of tetrasodium pyrophosphate (TSPP) was mixed with an 8.7 kg quantity of the P-ZSM-5 slurry from above (P-ZSM-5 dry weight of 3 kg) to form a TSPP/P-ZSM-5 slurry. The pH of the P-ZSM-5 slurry prior to TSPP addition was measured at about 1.8 pH. The resulting TSPP/P-ZSM-5 slurry was then added to the mix tank, and the pH of the mix tank contents was maintained below 1 pH by the addition, over time, of a total of 1.1 kg of HNO$_3$ (70 wt %). The resulting pH of the mix tank contents was 0.96.

A 5.2 kg quantity of kaolin clay (dry weight of 4.4 kg) was added to the mix tank. The resulting pH following kaolin addition was 0.98. The contents of the mix tank were then stirred for about 5 minutes.

The contents of the mix tank were then spray dried thereby forming a catalyst.

The catalyst was then slurried in hot (60-70° C.) process water (at 4 times catalyst weight) while simultaneously dosing with ammonium hydroxide (NH$_4$OH) to prevent the pH from dropping below 3.5. The pH was then adjusted to 3.5-4 using NH$_4$OH.

Ammonium sulfate (NH$_4$)$_2$SO$_4$ (at 0.1 times the crude catalyst weight) was then added to the slurry. The slurry was mixed for 10 minutes and filtered. The filter cake was re-slurried using hot process water and (NH$_4$)$_2$SO$_4$ maintaining a pH of 3.5-4.0, and such was repeated at least once. The filter cake was re-slurried in hot process water adjusting the pH to 8.0-8.5 with NH$_4$OH. The slurry was mixed for 10 minutes then filtered. The filter cake was washed with hot water (at 2 times the crude catalyst weight). The catalyst was dried in an oven at about 110° C. overnight.

The dried catalyst was placed in a furnace and calcined at 400° C. for 1 hour, thereby forming Catalyst A.

Example 2

Catalyst B Preparation

A 32 kg quantity of the PSA binder solution (silica dry weight of 3.1 kg) was added to a mix tank.

In a separate container, the pH of a portion of the P-ZSM-5 slurry was adjusted from a pH of about 1.6 to about 3 pH by the addition of a sufficient quantity of dilute ammonium hydroxide (29 wt %). A 13.4 kg quantity of the pH adjusted P-ZSM-5 slurry (P-ZSM-5 dry weight of 4.2 kg) was then mixed with a 12 gram quantity of TSPP to form a TSPP/P-ZSM-5 slurry. The resulting TSPP/P-ZSM-5 slurry was then added to the mix tank, and the pH of the resulting mix tank contents was about 2.

Next, a 3.7 kg quantity of kaolin clay (dry weight of 3.2 kg) was added to the mix tank. The resulting pH following kaolin addition was about 2. The contents of the mix tank were then stirred for about 5 minutes.

The contents of the mix tank were then spray dried, thereby forming a catalyst.

The catalyst was placed in a furnace and calcined at 400° C. for 1 hour, thereby forming Catalyst B.

Example 3

Catalyst C Preparation

A quantity of water and a 36.7 kg quantity of the PSA binder solution (silica dry weight of 2.7 kg) were added to a mix tank.

In a separate container, a 17 gram quantity of TSPP was mixed with a 12.5 kg quantity of the P-ZSM-5 slurry from above (P-ZSM-5 dry weight of 3.2 kg) to form a TSPP/P-ZSM-5 slurry. The pH of the P-ZSM-5 slurry prior to TSPP addition was measured at 2 pH. The resulting TSPP/P-ZSM-5 slurry was then added to the mix tank, and the pH of the resulting mix tank contents was 1.9 pH.

A 5.4 kg quantity of kaolin clay (dry weight of 4.6 kg) was added to the mix tank. The resulting pH following kaolin addition was 1.9 pH. A 2.8 kg quantity of HNO$_3$ (70 wt %) was then added to the mix tank contents to lower the pH to below 1 pH. The contents of the mix tank were then stirred for about 5 minutes. The final slurry pH was 0.5.

The contents of the mix tank were then spray dried, thereby forming a catalyst.

The catalyst was placed in a furnace and calcined at 400° C. for 1 hour, thereby forming Catalyst C.

Example 4

Catalyst D Preparation (Control)

A 22 kg quantity of water and ice were combined with 250 grams of $H_2SO_4$ (50 wt %) and 24 grams of TSPP.

A dilute sodium silicate solution was prepared by mixing 13.3 kg of sodium silicate (29 wt % $SiO_2$) with 14 kg $H_2O$. The 27.3 kg quantity of dilute sodium silicate solution (silica dry weight of 3.9 kg) was added to the mix tank contents. $H_2SO_4$ (50 wt %) was also simultaneously added such that the pH of the mix tank contents was maintained at pH 2.0+/−0.2. The resulting pH, after all of the dilute sodium silicate was added, was 3.5 pH.

A 7.7 kg quantity of kaolin clay (dry weight of 6.6 kg) was added to the mix tank. The contents of the mix tank were then stirred for about 5 minutes.

In a separate container, the pH of a portion of the P-ZSM-5 slurry was adjusted to about 3.5 pH by the addition of a sufficient quantity of dilute ammonium hydroxide (10 wt %). A quantity of the pH adjusted P-ZSM-5 slurry (P-ZSM-5 dry weight of 4.5 kg) was then added to the mix tank contents. The pH of the resulting mix tank contents was then adjusted to about 3.5.

The contents of the mix tank were then spray dried, thereby forming a catalyst.

The catalyst was then slurried in hot (60-70° C.) process water (at 4 times catalyst weight) while simultaneously dosing with ammonium hydroxide ($NH_4OH$) to prevent the pH from dropping below 3.5. The pH was then adjusted to 3.5-4 using $NH_4OH$.

Ammonium sulfate $(NH_4)_2SO_4$ (at 0.1 times the catalyst weight) was then added to the slurry. The slurry was mixed for 10 minutes and filtered. The filter cake was re-slurried using hot process water and $(NH_4)_2SO_4$ maintaining a pH of 3.5-4.0, and such was repeated at least once. The filter cake was re-slurried in hot process water adjusting the pH to 8.0-8.5 with $NH_4OH$. The slurry was mixed for 10 minutes then filtered. The filter cake was washed with hot water (at 2 times the crude catalyst weight). The catalyst was dried in an oven at about 110° C. overnight.

The dried catalyst was placed in a furnace and calcined at 500° C. for 4 hours allowing a 3-hour window for the furnace to ramp up to the desired temperature, thereby forming Catalyst D.

Example 5

Preparation of Catalysts F1-F7

Catalyst F1:

A quantity of water and a 24.1 kg quantity of the PSA binder solution (silica dry weight of 2.5 kg) were added to a mix tank.

In a separate container, a 10 gram quantity of TSPP was mixed with a 10.1 kg quantity of the P-ZSM-5 slurry from above (P-ZSM-5 dry weight of 3.6 kg) to form a TSPP/P-ZSM-5 slurry. The pH of the P-ZSM-5 slurry prior to TSPP addition was measured at 2.7 pH. The resulting TSPP/P-ZSM-5 slurry was then added to the mix tank, and the pH of the resulting mix tank contents was 1.9 pH.

A 3.4 kg quantity of kaolin clay (dry weight of 2.9 kg) was added to the mix tank. The resulting pH following kaolin addition was 2 pH. A 0.9 kg quantity of potassium nitrate was then added as a PRA to the mix tank contents (about 10 wt % on top of the final catalyst formulation on a dry weight basis) resulting in a pH of 2 pH.

The contents of the mix tank were then spray dried, thereby forming a catalyst.

In order to remove the PRA, the catalyst was then slurried in hot (60-70° C.) process water (at 4 times catalyst weight) while simultaneously dosing with ammonium hydroxide ($NH_4OH$) to prevent the pH from dropping below 3.5. The pH was then adjusted to 3.5-4 using $NH_4OH$.

Ammonium sulfate $(NH_4)_2SO_4$ (at 0.1 times the catalyst weight) was then added to the slurry. The slurry was mixed for 10 minutes and filtered. The filter cake was re-slurried using hot process water and $(NH_4)_2SO_4$ maintaining a pH of 3.5-4.0, and such was repeated at least once. The filter cake was re-slurried in hot process water adjusting the pH to 8.0-8.5 with $NH_4OH$. The slurry was mixed for 10 minutes then filtered. The filter cake was washed with hot water (at 2 times the crude catalyst weight). The catalyst was dried in an oven at about 110° C. overnight.

The dried catalyst was placed in a furnace and calcined at 600° C. for 1 hour. The calcined catalyst was then subjected to steam treatment in 100% steam for 4 hours at about 788 C, thereby forming Catalyst F1.

Catalyst F2:

A quantity of water and a 24.1 kg quantity of the PSA binder solution (silica dry weight of 2.5 kg) were added to a mix tank.

In a separate container, a 10 gram quantity of TSPP was mixed with a 10.1 kg quantity of the P-ZSM-5 slurry from above (P-ZSM-5 dry weight of 3.6 kg) to form a TSPP/P-ZSM-5 slurry. The pH of the P-ZSM-5 slurry prior to TSPP addition was measured at 2.0 pH. The resulting TSPP/P-ZSM-5 slurry was then added to the mix tank, and the pH of the resulting mix tank contents was 1.5 pH.

A 3.4 kg quantity of kaolin clay (dry weight of 2.9 kg) was added to the mix tank. The resulting pH following kaolin addition was 1.6 pH. A 0.9 kg quantity of monoammonium phosphate was then added as a PRA to the mix tank contents (about 10 wt % on top of the final catalyst formulation on a dry weight basis). A 115 g quantity of $HNO_3$ was added to keep the pH less than 2.2 pH. The resulting mix tank pH was about 2.1 pH.

The contents of the mix tank were then spray dried, thereby forming a catalyst.

In order to remove the PRA, the catalyst was then slurried in hot (60-70° C.) process water (at 4 times catalyst weight) while simultaneously dosing with ammonium hydroxide ($NH_4OH$) to prevent the pH from dropping below 3.5. The pH was then adjusted to 3.5-4 using $NH_4OH$.

Ammonium sulfate $(NH_4)_2SO_4$ (at 0.1 times the catalyst weight) was then added to the slurry. The slurry was mixed for 10 minutes and filtered. The filter cake was re-slurried using hot process water and $(NH_4)_2SO_4$ maintaining a pH of 3.5-4.0, and such was repeated at least once. The filter cake was re-slurried in hot process water adjusting the pH to 8.0-8.5 with $NH_4OH$. The slurry was mixed for 10 minutes then filtered. The filter cake was washed with hot water (at 2 times the crude catalyst weight). The catalyst was dried in an oven at about 110° C. overnight.

The dried catalyst was placed in a furnace and calcined at 600° C. for 1 hour. The calcined catalyst was then subjected to steam treatment in 100% steam for 4 hours at about 788 C, thereby forming Catalyst F2.

Catalyst F3:

A quantity of water and a 24.1 kg quantity of the PSA binder solution (silica dry weight of 2.5 kg) were added to a mix tank.

In a separate container, a 10 gram quantity of TSPP was mixed with a 10.1 kg quantity of the P-ZSM-5 slurry from above (P-ZSM-5 dry weight of 3.6 kg) to form a TSPP/P-ZSM-5 slurry. The pH of the P-ZSM-5 slurry prior to TSPP addition was measured at 2.7 pH. The resulting TSPP/P-ZSM-5 slurry was then added to the mix tank, and the pH of the resulting mix tank contents was 2.1 pH.

A 3.4 kg quantity of kaolin clay (dry weight of 2.9 kg) was added to the mix tank. The resulting pH following kaolin addition was 2.1 pH. A 0.9 kg quantity of TSPP was then added as a PRA to the mix tank contents (about 10 wt % on top of the final catalyst formulation on a dry weight basis). A 640 g quantity of $HNO_3$ was added to keep the pH less than 2.2 pH. The resulting mix tank pH was about 1.9 pH.

The contents of the mix tank were then spray dried, thereby forming a catalyst.

In order to remove the PRA, the catalyst was then slurried in hot (60-70° C.) process water (at 4 times catalyst weight) while simultaneously dosing with ammonium hydroxide ($NH_4OH$) to prevent the pH from dropping below 3.5. The pH was then adjusted to 3.5-4 using $NH_4OH$.

Ammonium sulfate $(NH_4)_2SO_4$ (at 0.1 times the catalyst weight) was then added to the slurry. The slurry was mixed for 10 minutes and filtered. The filter cake was re-slurried using hot process water and $(NH_4)_2SO_4$ maintaining a pH of 3.5-4.0, and such was repeated at least once. The filter cake was re-slurried in hot process water adjusting the pH to 8.0-8.5 with $NH_4OH$. The slurry was mixed for 10 minutes then filtered. The filter cake was washed with hot water (at 2 times the crude catalyst weight). The catalyst was dried in an oven at about 110° C. overnight.

The dried catalyst was placed in a furnace and calcined at 600° C. for 1 hour. The calcined catalyst was then subjected to steam treatment in 100% steam for 4 hours at about 788 C, thereby forming Catalyst F3.

Catalyst F4:

A quantity of water and a 31.6 kg quantity of the PSA binder solution (silica dry weight of 3.2 kg) were added to a mix tank.

In a separate container, a 13 gram quantity of TSPP was mixed with a 13.3 kg quantity of the P-ZSM-5 slurry from above (P-ZSM-5 dry weight of 4.5 kg) to form a TSPP/P-ZSM-5 slurry. The pH of the P-ZSM-5 slurry prior to TSPP addition was measured at 2.6 pH. The resulting TSPP/P-ZSM-5 slurry was then added to the mix tank, and the pH of the resulting mix tank contents was 2 pH.

A 4.2 kg quantity of kaolin clay (dry weight of 3.6 kg) was added to the mix tank. The resulting pH following kaolin addition was 2 pH. A 0.23 kg quantity of dry sucrose was then added as a PRA to the mix tank contents (about 2 wt % on top of the final catalyst formulation on a dry weight basis) resulting in a pH of 2 pH.

The contents of the mix tank were then spray dried, thereby forming a catalyst.

In order to remove the PRA, the catalyst was then slurried in hot (60-70° C.) process water (at 4 times catalyst weight) while simultaneously dosing with ammonium hydroxide ($NH_4OH$) to prevent the pH from dropping below 3.5. The pH was then adjusted to 3.5-4 using $NH_4OH$.

Ammonium sulfate $(NH_4)_2SO_4$ (at 0.1 times the catalyst weight) was then added to the slurry. The slurry was mixed for 10 minutes and filtered. The filter cake was re-slurried using hot process water and $(NH_4)_2SO_4$ maintaining a pH of 3.5-4.0, and such was repeated at least once. The filter cake was re-slurried in hot process water adjusting the pH to 8.0-8.5 with $NH_4OH$. The slurry was mixed for 10 minutes then filtered. The filter cake was washed with hot water (at 2 times the crude catalyst weight). The catalyst was dried in an oven at about 110° C. overnight.

The dried catalyst was placed in a furnace and calcined at 600° C. for 1 hour. The calcined catalyst was then subjected to steam treatment in 100% steam for 4 hours at about 788 C, thereby forming Catalyst F4.

Catalyst F5:

A quantity of water and a 24.9 kg quantity of the PSA binder solution (silica dry weight of 2.5 kg) were added to a mix tank.

In a separate container, a 10 gram quantity of TSPP was mixed with a 10.6 kg quantity of the P-ZSM-5 slurry from above (P-ZSM-5 dry weight of 3.6 kg) to form a TSPP/P-ZSM-5 slurry. The pH of the P-ZSM-5 slurry prior to TSPP addition was measured at 2.7 pH. The resulting TSPP/P-ZSM-5 slurry was then added to the mix tank, and the pH of the resulting mix tank contents was 2.1 pH.

A 3.4 kg quantity of kaolin clay (dry weight of 2.9 kg) was added to the mix tank. The resulting pH following kaolin addition was 2.1 pH. A 0.9 kg quantity of dry sucrose was then added as a PRA to the mix tank contents (about 10 wt % on top of the final catalyst formulation on a dry weight basis) resulting in a pH of 2.1 pH.

The contents of the mix tank were then spray dried, thereby forming a catalyst.

In order to remove the PRA, the catalyst was then slurried in hot (60-70° C.) process water (at 4 times catalyst weight) while simultaneously dosing with ammonium hydroxide ($NH_4OH$) to prevent the pH from dropping below 3.5. The pH was then adjusted to 3.5-4 using $NH_4OH$.

Ammonium sulfate $(NH_4)_2SO_4$ (at 0.1 times the catalyst weight) was then added to the slurry. The slurry was mixed for 10 minutes and filtered. The filter cake was re-slurried using hot process water and $(NH_4)_2SO_4$ maintaining a pH of 3.5-4.0, and such was repeated at least once. The filter cake was re-slurried in hot process water adjusting the pH to 8.0-8.5 with $NH_4OH$. The slurry was mixed for 10 minutes then filtered. The filter cake was washed with hot water (at 2 times the crude catalyst weight). The catalyst was dried in an oven at about 110° C. overnight.

The dried catalyst was placed in a furnace and calcined at 600° C. for 1 hour. The calcined catalyst was then subjected to steam treatment in 100% steam for 4 hours at about 788 C, thereby forming Catalyst F5.

Catalyst F6:

A quantity of water and a 27.8 kg quantity of the PSA binder solution (silica dry weight of 2.5 kg) were added to a mix tank.

In a separate container, a 10 gram quantity of TSPP was mixed with a 9.7 kg quantity of the P-ZSM-5 slurry from above (P-ZSM-5 dry weight of 3.5 kg) to form a TSPP/P-ZSM-5 slurry. The pH of the P-ZSM-5 slurry prior to TSPP addition was measured at 2.6 pH. The resulting TSPP/P-ZSM-5 slurry was then added to the mix tank, and the pH of the resulting mix tank contents was 2.4 pH.

A 3.3 kg quantity of kaolin clay (dry weight of 2.8 kg) was added to the mix tank. The resulting pH following kaolin addition was 2.4 pH. A 1.32 kg quantity of dry sucrose was then added as a PRA to the mix tank contents (about 15 wt % on top of the final catalyst formulation on a dry weight basis) resulting in a pH of 2.4 pH.

The contents of the mix tank were then spray dried, thereby forming a catalyst.

In order to remove the PRA, the catalyst was then slurried in hot (60-70° C.) process water (at 4 times catalyst weight) while simultaneously dosing with ammonium hydroxide (NH₄OH) to prevent the pH from dropping below 3.5. The pH was then adjusted to 3.5-4 using NH₄OH.

Ammonium sulfate (NH₄)₂SO₄ (at 0.1 times the catalyst weight) was then added to the slurry. The slurry was mixed for 10 minutes and filtered. The filter cake was re-slurried using hot process water and (NH₄)₂SO₄ maintaining a pH of 3.5-4.0, and such was repeated at least once. The filter cake was re-slurried in hot process water adjusting the pH to 8.0-8.5 with NH₄OH. The slurry was mixed for 10 minutes then filtered. The filter cake was washed with hot water (at 2 times the crude catalyst weight). The catalyst was dried in an oven at about 110° C. overnight.

The dried catalyst was placed in a furnace and calcined at 600° C. for 1 hour. The calcined catalyst was then subjected to steam treatment in 100% steam for 4 hours at about 788 C, thereby forming Catalyst F6.

Catalyst F7:

A quantity of water and a 27.8 kg quantity of the PSA binder solution (silica dry weight of 2.5 kg) were added to a mix tank.

In a separate container, a 10 gram quantity of TSPP was mixed with a 9.7 kg quantity of the P-ZSM-5 slurry from above (P-ZSM-5 dry weight of 3.5 kg) to form a TSPP/P-ZSM-5 slurry. The pH of the P-ZSM-5 slurry prior to TSPP addition was measured at 2.6 pH. The resulting TSPP/P-ZSM-5 slurry was then added to the mix tank, and the pH of the resulting mix tank contents was 2.4 pH.

A 3.3 kg quantity of kaolin clay (dry weight of 2.8 kg) was added to the mix tank. The resulting pH following kaolin addition was 2.4 pH. A 1.76 kg quantity of dry sucrose was then added as a PRA to the mix tank contents (about 20 wt % on top of the final catalyst formulation on a dry weight basis) resulting in a pH of 2.4 pH.

The contents of the mix tank were then spray dried, thereby forming a catalyst.

In order to remove the PRA, the catalyst was then slurried in hot (60-70° C.) process water (at 4 times catalyst weight) while simultaneously dosing with ammonium hydroxide (NH₄OH) to prevent the pH from dropping below 3.5. The pH was then adjusted to 3.5-4 using NH₄OH.

Ammonium sulfate (NH₄)₂SO₄ (at 0.1 times the catalyst weight) was then added to the slurry. The slurry was mixed for 10 minutes and filtered. The filter cake was re-slurried using hot process water and (NH₄)₂SO₄ maintaining a pH of 3.5-4.0, and such was repeated at least once. The filter cake was re-slurried in hot process water adjusting the pH to 8.0-8.5 with NH₄OH. The slurry was mixed for 10 minutes then filtered. The filter cake was washed with hot water (at 2 times the crude catalyst weight). The catalyst was dried in an oven at about 110° C. overnight.

The dried catalyst was placed in a furnace and calcined at 600° C. for 1 hour. The calcined catalyst was then subjected to steam treatment in 100% steam for 4 hours at about 788 C, thereby forming Catalyst F7.

Example 6

Preparation of Catalysts GH, G1, G2, H1, H2, and Base Case

Catalyst GH Preparation

A 79.3 g quantity of the PSA binder was added to a mix tank. In a separate vessel, 33 g of tetrasodium pyrophosphate were dissolved in 40.8 kg of the ZSM-5 slurry (28 wt % solids) and then added to the PSA binder in the mix tank. A 10.8 kg quantity of kaolin clay was added and the mixture was then spray dried to form Catalyst GH.

Catalyst G1 Preparation

A 1500 g quantity of Catalyst GH was wet impregnated with 284.8 g of 57% phosphoric acid, diluted with 132.53 g D.I. water. The product was then dried overnight at 110° C. and calcined for 4 hours at 600° C., forming Catalyst G1.

Catalyst G2 Preparation

A 1500 g quantity of Catalyst GH was wet impregnated with 190.49 g mono ammonium phosphate (MAP) dissolved in 226.8 g water. This product was then dried overnight at 110° C. and calcined for 4 hours at 600° C., forming Catalyst G2.

Catalyst H1 Preparation

A 1500 g quantity of Catalyst GH was wet impregnated with 142.4 g of 57% phosphoric acid, diluted with 274.9 g D.I. water. The product was then dried overnight at 110° C. and calcined for 4 hours at 600° C., forming Catalyst H1.

Catalyst H2 Preparation

A 1500 g quantity of Catalyst GH was wet impregnated with 95.2 g MAP dissolved in 322.1 g water. This product was then dried overnight at 110° C. and calcined for 4 hours at 600° C., forming Catalyst H2.

Base Case Catalyst Preparation

A 28.64 kg quantity of PSA binder (containing 10.75% SiO2) was diluted with 5.16 kg of deionized water. In a separate vessel, 189 g of 29% NH4OH and 13 g of tetra-sodium pyrophosphate were added to 12.06 g of P-ZSM-5 slurry (36.47 wt % solids) forming a zeolite mixture. The zeolite mixture was added to the binder mixture. A 4.12 kg quantity of kaolin clay was then added and the resulting mixture was spray dried, forming the Base Case Catalyst.

Example 7

Catalyst Characterization

Fresh samples of catalysts A-D, F1-F7, G1, G2, H1, H2, and Base Case were calcined at 600° C. and analyzed for various properties, the results of which are shown in Tables 1-4 below. Also, steamed samples of Catalysts F4-F7 were calcined at 600° C. and analyzed for various properties, the results of which are shown in Tables 5 and 6 below. For Loss on Ignition, the samples were subjected to such testing without the intermediate 600° C. calcination.

TABLE 1

| Property | Method | A | B | C | D |
|---|---|---|---|---|---|
| Attrition Index | ASTM D5757 | 2.1 | 3.1 | 7.1 | 10.9 |
| Apparent Bulk Density | ASTM B329 | 0.80 | 0.84 | 0.75 | 0.75 |
| Total Surface Area (TSA) | BET plot, P/P0 = .01-.10 | 246 | 130 | 161 | 122 |
| Meso Surface Area (MSA) | t-plot, 3.5-5.0 Å | 141 | 25 | 47 | 43 |
| Micro Surface Area (ZSA) | ZSA = TSA − MSA | 104 | 105 | 114 | 79 |
| Loss on Ignition | TGA method | 9.1 | 9.2 | 10.5 | 10.2 |

TABLE 2

| Property | Method | F1 | F2 | F3 | F4 |
|---|---|---|---|---|---|
| Attrition Index | ASTM D5757 | 1.1 | 1.5 | 1.5 | 1.1 |
| Apparent Bulk Density | ASTM B329 | 0.78 | 0.80 | 0.80 | 0.78 |

TABLE 2-continued

| Property | Method | F1 | F2 | F3 | F4 |
|---|---|---|---|---|---|
| Total Surface Area (TSA) | BET plot, P/P0 = .01-.10 | 268 | 284 | 336 | 209 |
| Meso Surface Area (MSA) | t-plot, 3.5-5.0 Å | 63 | 75 | 117 | 34 |
| Micro Surface Area (ZSA) | ZSA = TSA - MSA | 206 | 209 | 219 | 175 |
| Loss on Ignition | TGA method | 7.9 | 10.8 | 8.1 | 7.2 |

TABLE 3

| Property | Method | F5 | F6 | F7 |
|---|---|---|---|---|
| Attrition Index | ASTM D5757 | 1.9 | 4.6 | 5.2 |
| Apparent Bulk Density | ASTM B329 | 0.77 | 0.74 | 0.71 |
| Total Surface Area (TSA) | BET plot, P/P0 = .01-.10 | 285 | 329 | 356 |
| Meso Surface Area (MSA) | t-plot, 3.5-5.0 Å | 63 | 107 | 180 |
| Micro Surface Area (ZSA) | ZSA = TSA - MSA | 222 | 222 | 176 |
| Loss on Ignition | TGA method | 8.1 | 8.3 | 7.8 |

TABLE 4

| Property | Method | G1 | G2 | H1 | H2 | Base Case |
|---|---|---|---|---|---|---|
| Attrition Index | ASTM 5757 | 3.17 | 3.22 | 4.04 | 3.69 | 2.86 |
| Total Surface Area (TSA) | BET plot, P/P0 = .01-.10 | 70.8 | 126.7 | 136.1 | 134.4 | 120.3 |
| Meso Surface Area (MSA) | t-plot, 3.5-5.0 Å | — | 26.8 | 22 | 23.1 | 17.2 |
| Micro Surface Area (ZSA) | ZSA = TSA-MSA | 68.8 | 99.9 | 114.1 | 111.3 | 103.1 |
| Loss on Ignition | TGA Method | 6.66 | 6.56 | 5.18 | 6.18 | 6.81 |

TABLE 5

| Property | Method | F1* | F2* | F3* | F4* |
|---|---|---|---|---|---|
| Attrition Index | ASTM D5757 | — | — | — | — |
| Apparent Bulk Density | ASTM B329 | — | 0.87 | 0.87 | 0.85 |
| Total Surface Area (TSA) | BET plot, P/P0 = .01-.10 | 117 | 138 | 143 | 142 |
| Meso Surface Area (MSA) | t-plot, 3.5-5.0 Å | 51 | 57 | 62 | 48 |
| Micro Surface Area (ZSA) | ZSA = TSA - MSA | 66 | 82 | 82 | 94 |
| Loss on Ignition | TGA method | 0.8 | 1.0 | 1.0 | 0.7 |

TABLE 6

| Property | Method | F5* | F6* | F7* |
|---|---|---|---|---|
| Attrition Index | ASTM D5757 | — | — | — |
| Apparent Bulk Density | ASTM B329 | 0.86 | 0.82 | 0.80 |
| Total Surface Area (TSA) | BET plot, P/P0 = .01-.10 | 124 | 148 | 152 |
| Meso Surface Area (MSA) | t-plot, 3.5-5.0 Å | 40 | 68 | 80 |
| Micro Surface Area (ZSA) | ZSA = TSA - MSA | 84 | 81 | 72 |
| Loss on Ignition | TGA method | 1.9 | 1.0 | 2.1 |

*Steamed Catalyst

Figure 2:
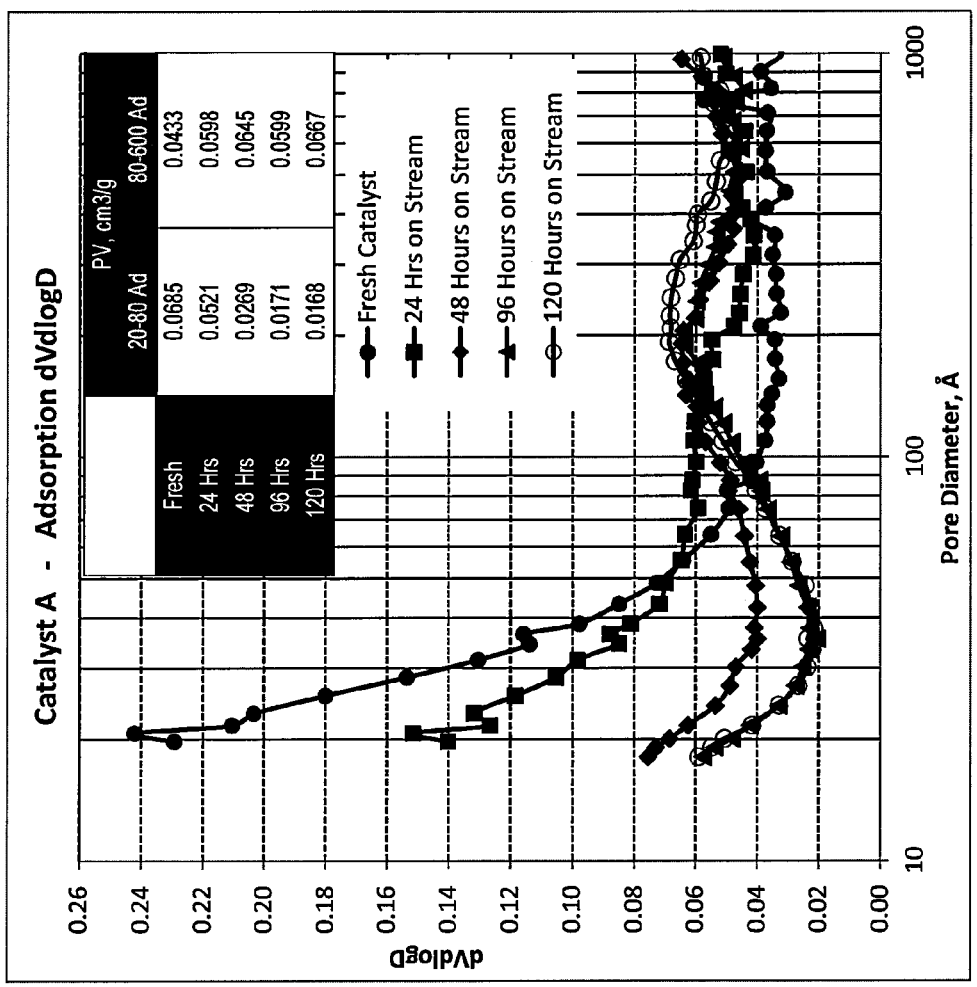
FIG. 2 is a plot showing the Nitrogen BJH pore volume distribution for a sample of Catalyst A.
Figure 3:
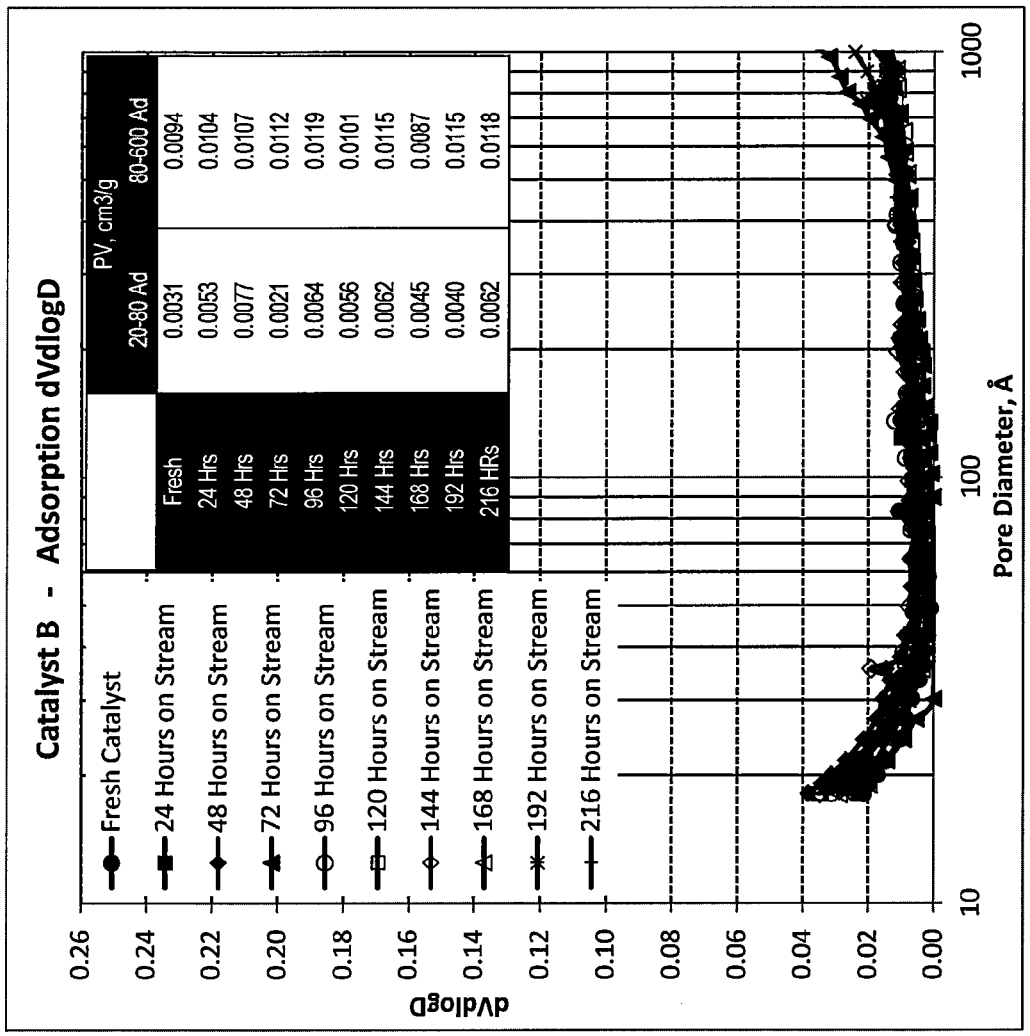
FIG. 3 is a plot showing the Nitrogen BJH pore volume distribution for a sample of Catalyst B.
Figure 4:
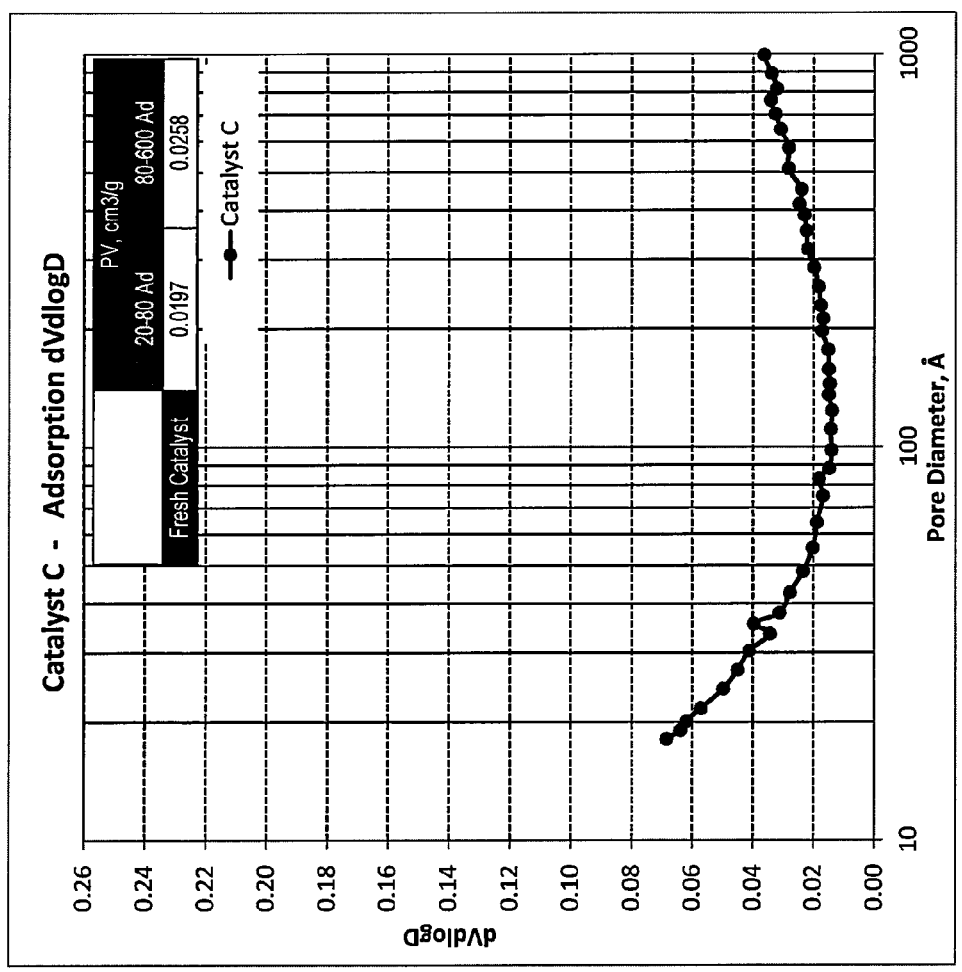
FIG. 4 is a plot showing the Nitrogen BJH pore volume distribution for a sample of Catalyst C.

Catalysts A, B, C, and F1-F7 were subjected to Nitrogen adsorption-desorption isotherm testing per ASTM D4222; and the resulting Nitrogen adsorption-desorption isotherms for catalysts A, B, C and F6 are presented in FIG. 1. Such isotherms show that the volume adsorbed is greater for Catalysts A, C and F6 as compared to Catalyst B. FIG. 1 also shows that the isotherm for Catalyst C is very flat in the range of 0.1-0.9 relative pressure, which is very similar to Catalyst B. FIGS. 2-4 show associated N2 BJH pore volume distributions resulting from such testing for Catalyst A (FIG. 2), Catalyst B (FIG. 3) and Catalyst C (FIG. 4). As can be seen from FIG. 2, the pore size distribution for Catalyst A shifts dramatically from small pores to larger pores with time on stream. Also, FIGS. 3 and 4 show that the pore size distributions for Catalysts B and C are much more stable with time on stream as compared to Catalyst A.

Figure 5:
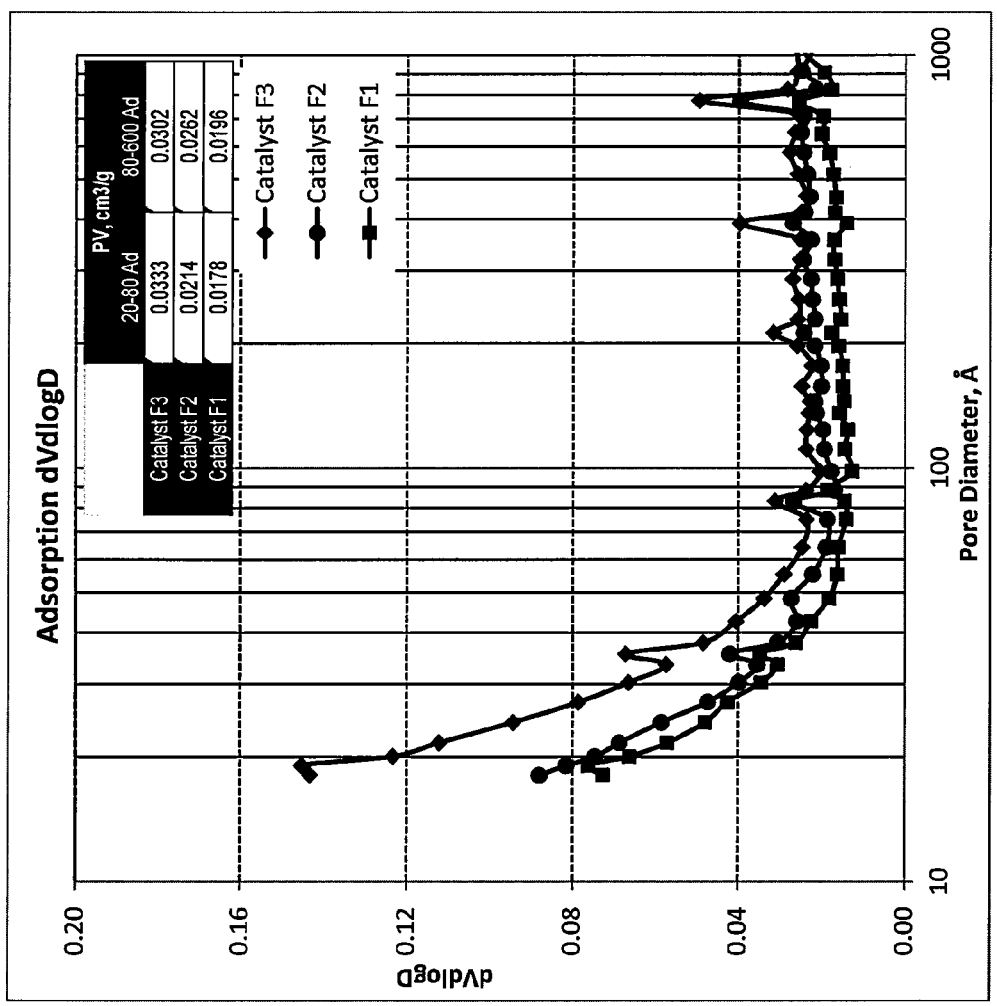
FIG. 5 is a plot showing the Nitrogen BJH pore volume distribution for fresh samples of Catalysts F1-F3.
Figure 6:
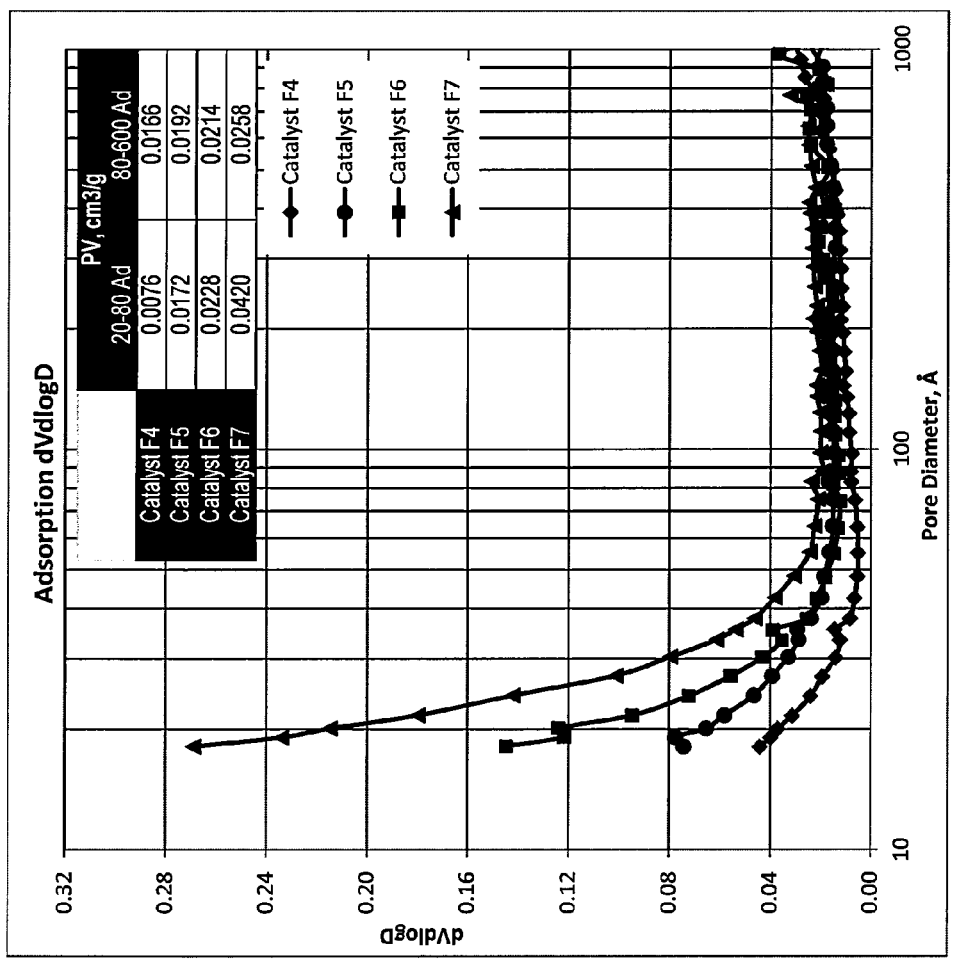
FIG. 6 is a plot showing the Nitrogen BJH pore volume distribution for fresh samples of Catalysts F4-F7.
Figure 7:
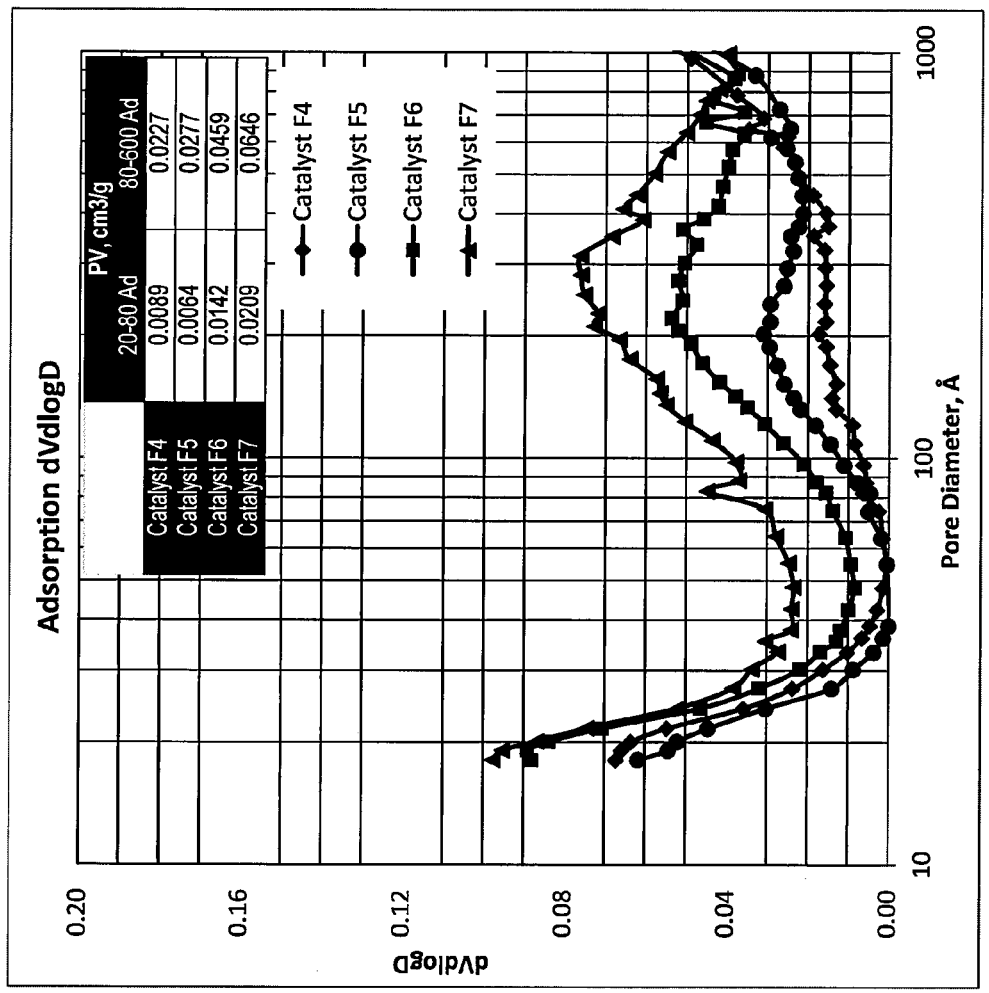
FIG. 7 is a plot showing the Nitrogen BJH pore volume distribution for steamed samples of Catalysts F4-F7.

FIGS. 5-7 show associated N2 BJH pore volume distributions for fresh (non-steamed) catalysts F1-F3 (FIG. 5), fresh catalysts F4-F7 (FIG. 6), and steamed catalysts F4-F7 (FIG. 7). As can be seen from FIGS. 5 and 6, the pore size distributions for the fresh catalysts prepared with ionic PRA's (F1-F3) are very similar to the distributions for the fresh catalysts prepared with non-ionic (sucrose) PRA's (F4-F7). Also, as shown in FIGS. 6 and 7, the pore size distributions for catalysts F4-F7 shift dramatically from small pores to larger pores upon steaming.

Example 8

Biomass Conversion Using Catalysts A Through D and Commercial Catalyst E in Circulating Riser Unit Each of the catalysts A, B and D and a commercially available FCC olefins catalyst containing ZSM-5 (referred to as Catalyst "E") were separately used as catalysts in the thermo-catalytic conversion of southern yellow pine wood chips in a circulating riser unit including a product/catalyst separator and a catalyst regenerator. The riser outlet temperatures for the runs were each about 940° F. All runs were in the substantial absence of free oxygen. After separation of the product gases and vapors from the catalyst, the condensable portion of the product stream was condensed and allowed to gravity separate into aqueous and bio-oil phases. For each of the runs, the following were determined at different times on stream: bio-oil wt % oxygen, coke wt % yields, and bio-oil wt % yields (based on dry biomass feed weight).

Figure 8:
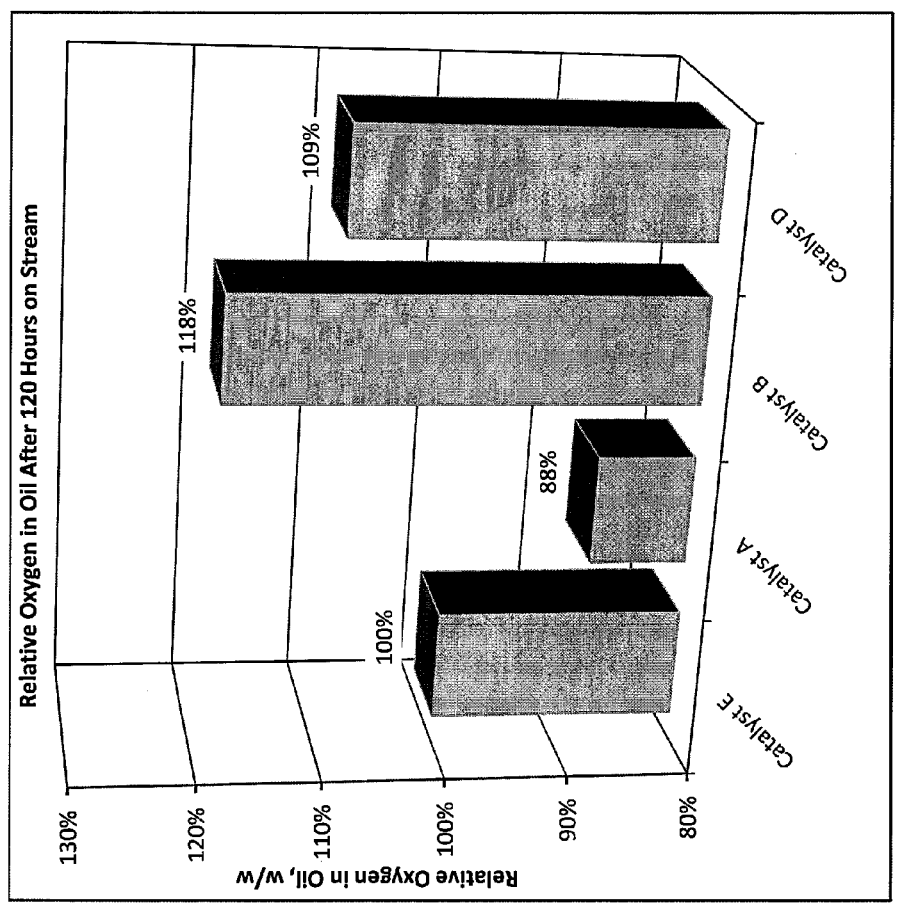
FIG. 8 is a plot showing relative oxygen in oil of bio-oils separately produced from the thermo-catalytic conversion of biomass in the presence of Catalysts A, B, D and E.

FIG. 8 shows relative oxygen in oil at 120 hours on stream for each of Catalysts A, B, D and E, all relative to the oxygen in oil for Catalyst E. As can be seen, Catalyst A demonstrated superior deoxygenation activity as compared to Catalysts B, D and E. It is believed that the superior deoxygenation activity for Catalyst A is due to the high pore volume of pores ranging in diameter from about 80 to about 600 Å.

Figure 9:
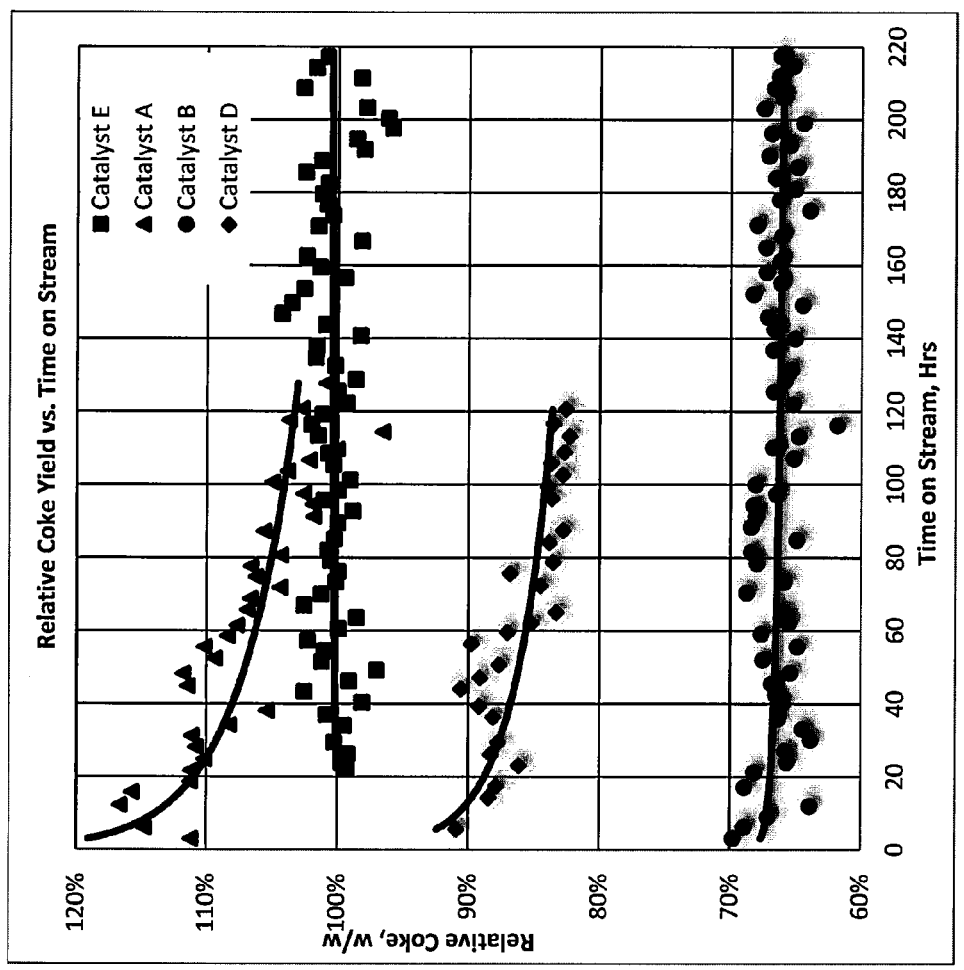
FIG. 9 is a plot showing relative coke of bio-oils separately produced from the thermo-catalytic conversion of biomass in the presence of Catalysts A, B, D and E.

However, it is believed that the lower, and stable, volume of pores ranging in diameter from about 80 to about 600 Å for Catalyst B as compared to Catalyst A accounts for the superior coke selectivity (reduced coke make) for Catalyst B as compared to Catalysts A, D and E. Such coke selectivity is shown in FIG. 9 which shows relative coke for each of Catalysts A, B, D and E, all relative to the coke make for Catalyst E.

Figure 10:
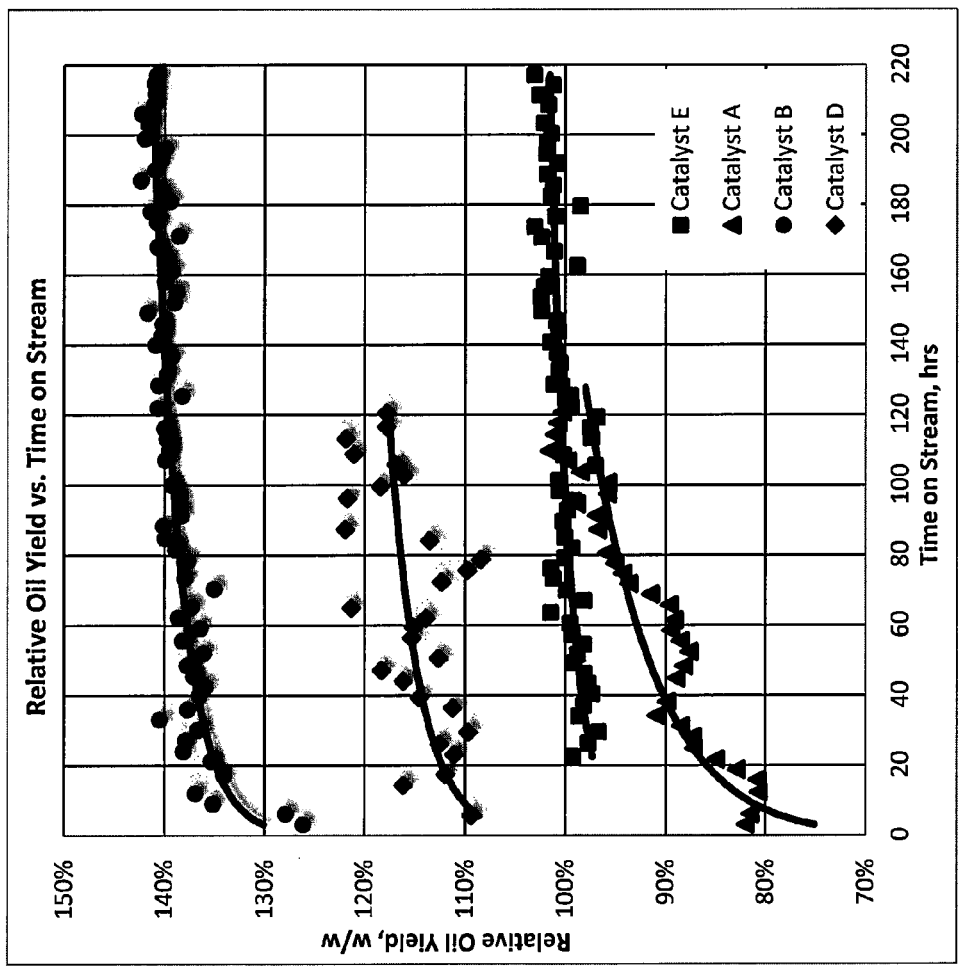
FIG. 10 is a plot showing relative oil yield of bio-oils separately produced from the thermo-catalytic conversion of biomass in the presence of Catalysts A, B, D and E.

FIG. 10 shows relative oil yield with time on stream for each of Catalysts A, B, D and E, all relative to the oil yield for Catalyst E. As can be seen, Catalyst B demonstrated the highest bio-oil yield with time on stream, exceeding that for Catalysts A, D, and E.

Figure 11:
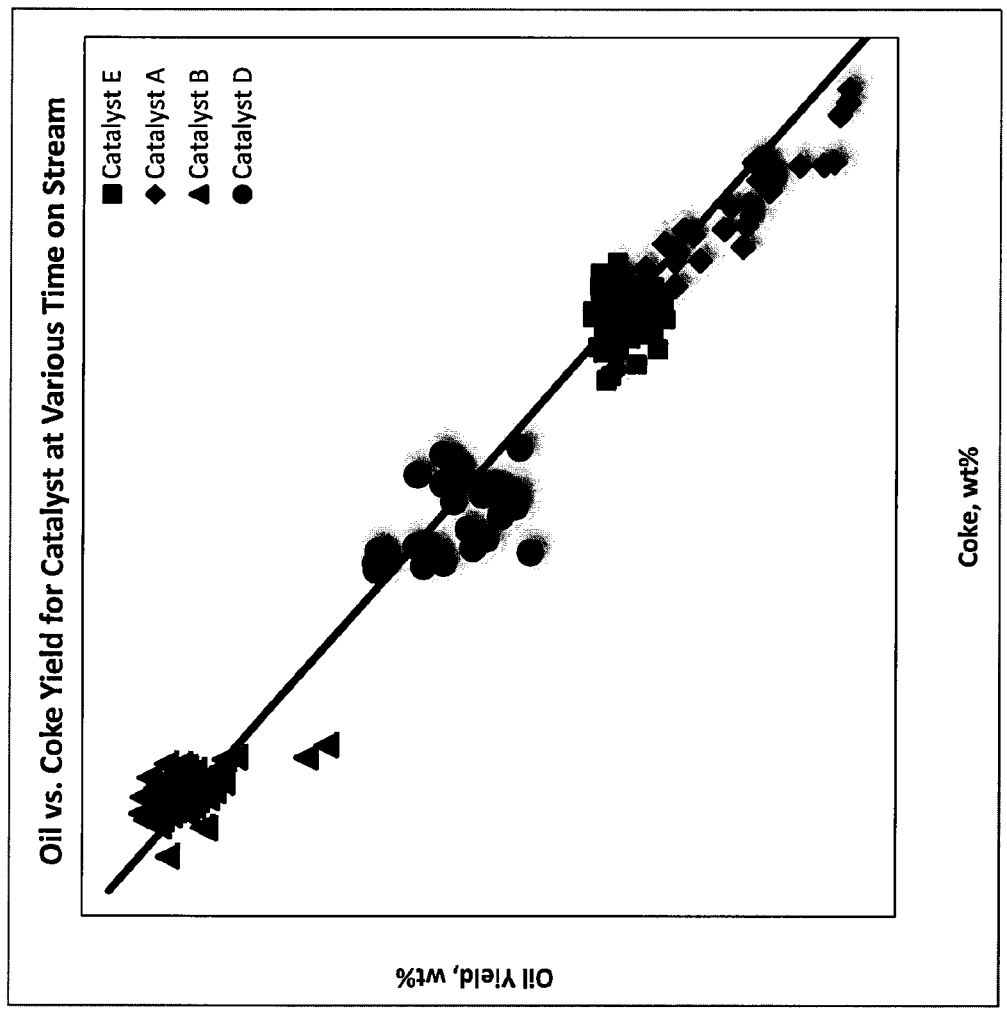
FIG. 11 is a plot showing relative oil yield vs. relative coke for bio-oils separately produced from the thermo-catalytic conversion of biomass in the presence of Catalysts A, B, D and E.

FIG. 11 shows a relationship between relative oil yield and relative coke yield, demonstrating that as the coke yield drops, it appears to shift into oil yield.

Example 9

Biomass Conversion using Catalysts A, B, C, F1-F7 and Commercial Catalyst E in a Laboratory Scale Biomass Conversion Batch Testing Unit Each of the catalysts A, B, C, F1-F7 and commercially available FCC olefins catalyst E were separately used as catalysts in the thermo-catalytic conversion of southern yellow pine wood chips in a laboratory scale biomass conversion batch testing unit. The unit temperatures for the runs were each about 940° F. All runs were in the substantial absence of free oxygen. After separation of the product gases and vapors from the catalyst, the condensable portion of the product stream was condensed and allowed to gravity separate into aqueous and bio-oil phases.

Figure 12:
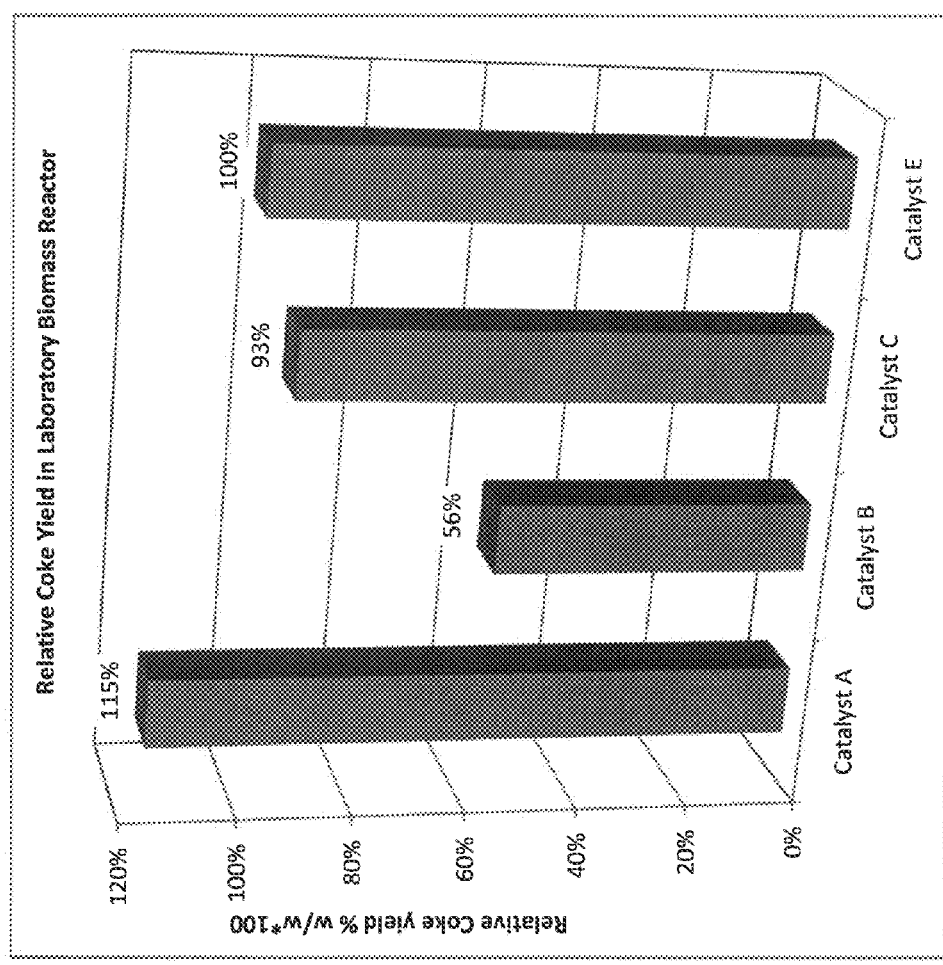
FIG. 12 is a plot showing relative coke yield of bio-oils separately produced from the thermo-catalytic conversion of biomass in the presence of Catalysts A, B, C and E.

FIG. 12 shows relative coke for each of Catalysts A, B, C and E, all relative to the coke make for Catalyst E. FIG. 12 shows superior coke selectivity for Catalyst B, and also shows that Catalyst C had lower coke yield as compared to Catalysts A and E.

Figure 13:
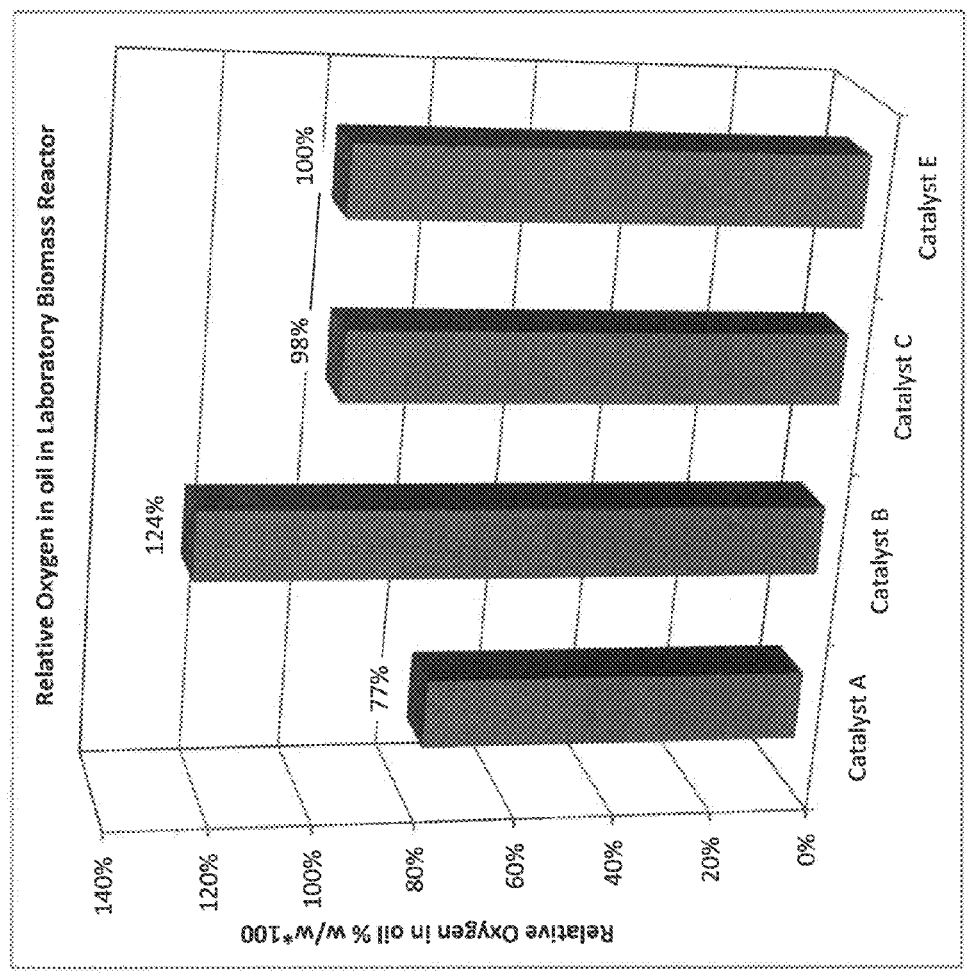
FIG. 13 is a plot showing relative oxygen in oil of bio-oils separately produced from the thermo-catalytic conversion of biomass in the presence of Catalysts A, B, C and E.

FIG. 13 shows relative oxygen in oil for each of catalysts A, B, C and E, all relative to the oxygen in oil for Catalyst E. FIG. 13 shows lower relative oxygen in oil for Catalyst A, while the relative oxygen in oil for Catalyst B was higher. Catalyst C had lower relative oxygen in oil as compared to Catalyst E, and as stated above, also had lower coke yield.

Figure 14:
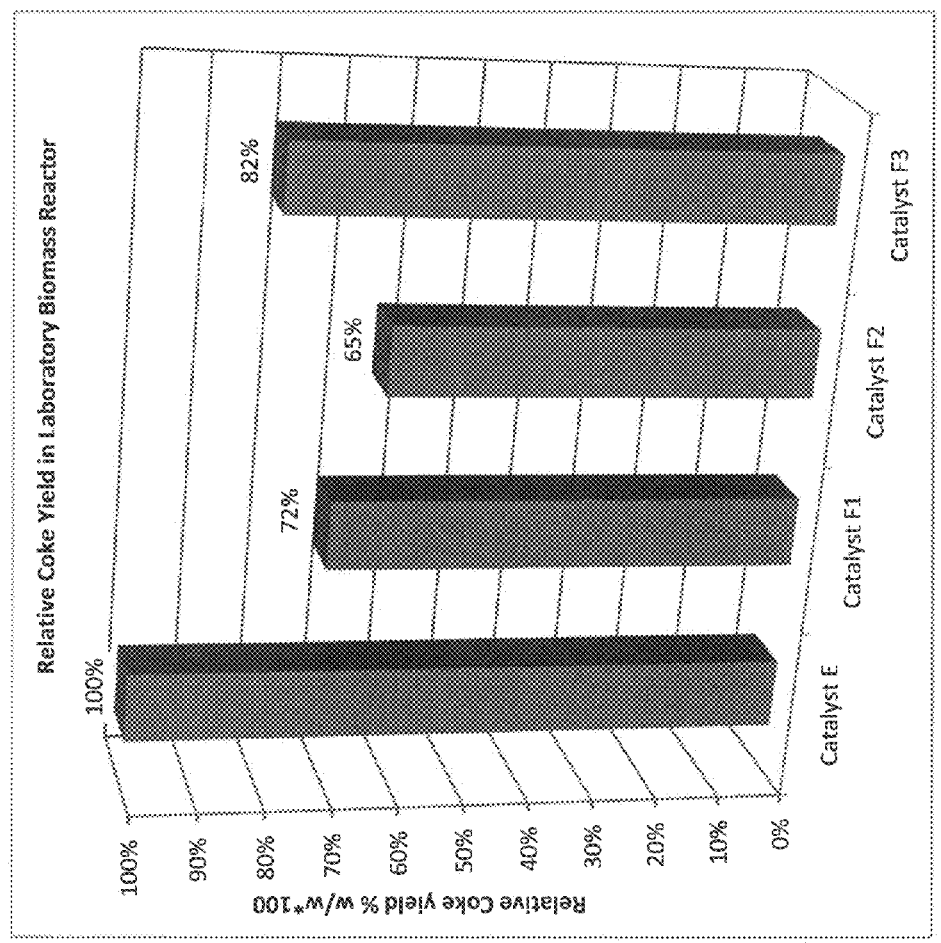
FIG. 14 is a plot showing relative coke yield of bio-oils separately produced from the thermo-catalytic conversion of biomass in the presence of Catalysts F1, F2, F3 and E.
Figure 15:
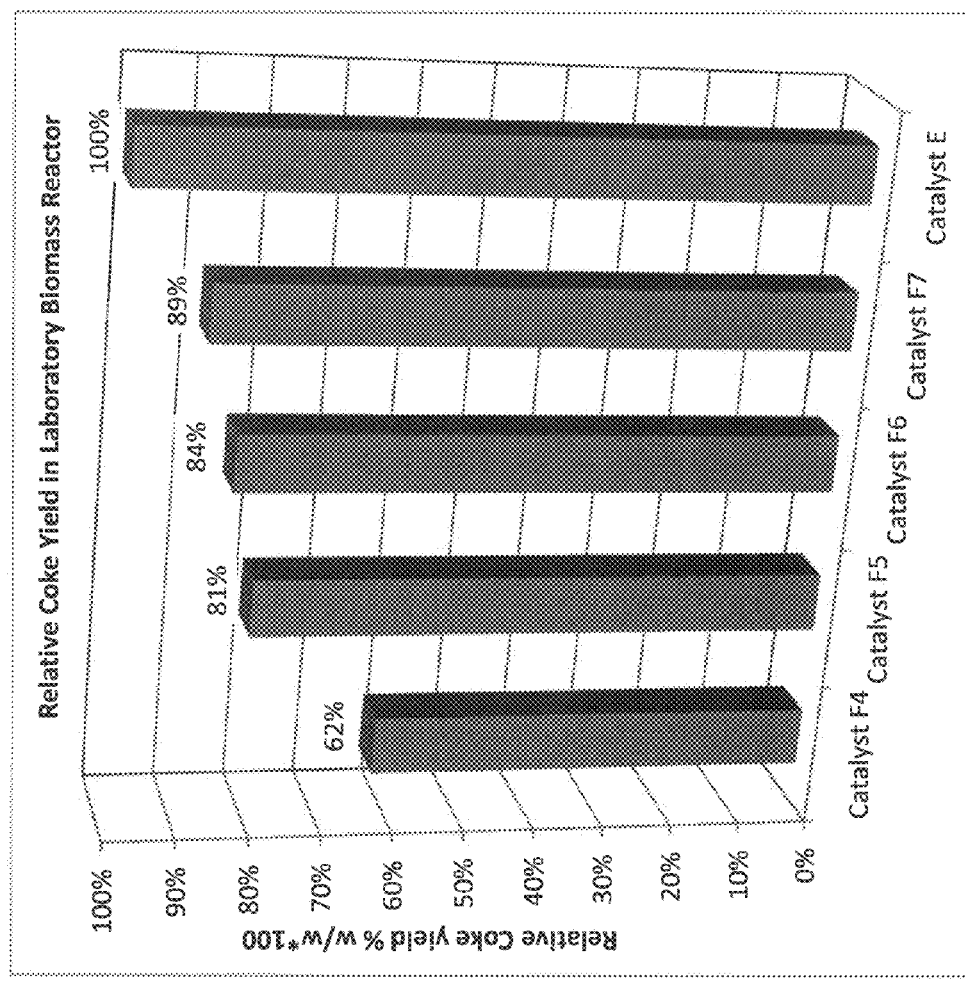
FIG. 15 is a plot showing relative coke yield of bio-oils separately produced from the thermo-catalytic conversion of biomass in the presence of Catalysts F4, F5, F6, F7 and E.

FIGS. 14 and 15 show relative coke for each of Catalysts F1-F7 and E, all relative to the coke make for Catalyst E. FIGS. 14 and 15 show superior coke selectivity for each of the Catalysts F1-F7 as compared to Catalyst E, with Catalysts F2 and F4 being the most superior.

Figure 16:
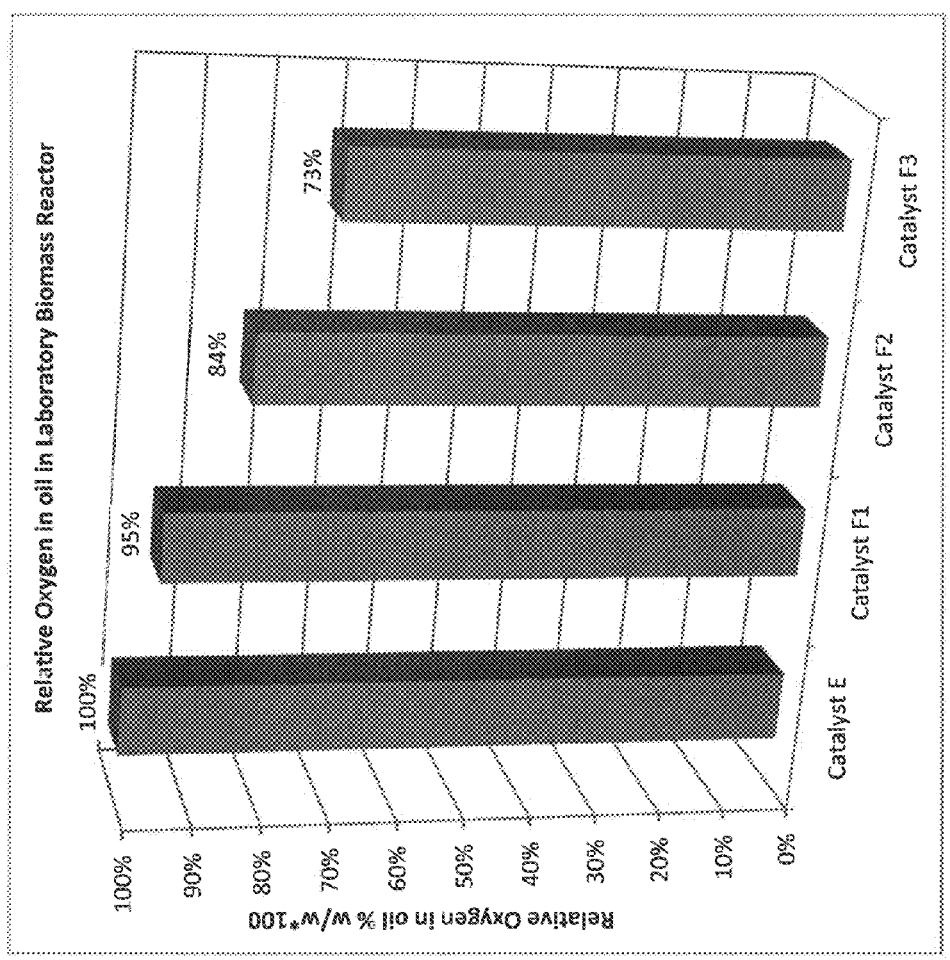
FIG. 16 is a plot showing relative oxygen in oil of bio-oils separately produced from the thermo-catalytic conversion of biomass in the presence of Catalysts F1, F2, F3 and E.
Figure 17:
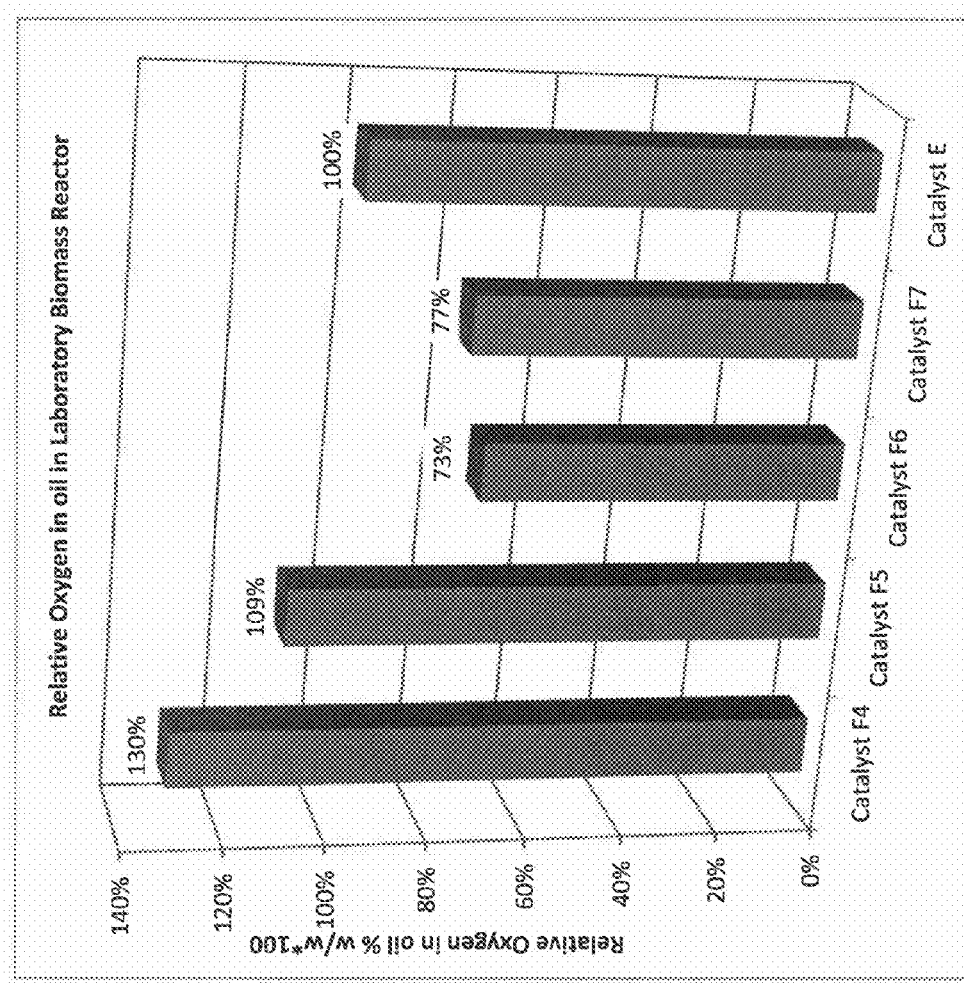
FIG. 17 is a plot showing relative oxygen in oil of bio-oils separately produced from the thermo-catalytic conversion of biomass in the presence of Catalysts F4, F5, F6, F7 and E.

FIGS. 16 and 17 show relative oxygen in oil for each of Catalysts F1-F7 and E, all relative to the oxygen in oil for Catalyst E. FIGS. 16 and 17 show that Catalysts F1-F3, F6 and F7 each had lower relative oxygen in oil as compared to Catalyst E. Also, Catalysts F4 and F5 had higher relative oxygen in oil, with Catalyst F5 being only slightly higher.

Example 10

Biomass Conversion Using Catalysts G1, G2, H1, H2, and Base Case in a Laboratory Scale Biomass Conversion Batch Testing Unit Each of the catalysts G1, G2, H1, H2, and Base Case were separately used as catalysts in the thermo-catalytic conversion of southern yellow pine wood chips in a laboratory scale biomass conversion batch testing unit. The unit temperatures for the runs were each about 940° F. All runs were in the substantial absence of free oxygen. After separation of the product gases and vapors from the catalyst, the condensable portion of the product stream was condensed and allowed to gravity separate into aqueous and bio-oil phases.

Figure 18:
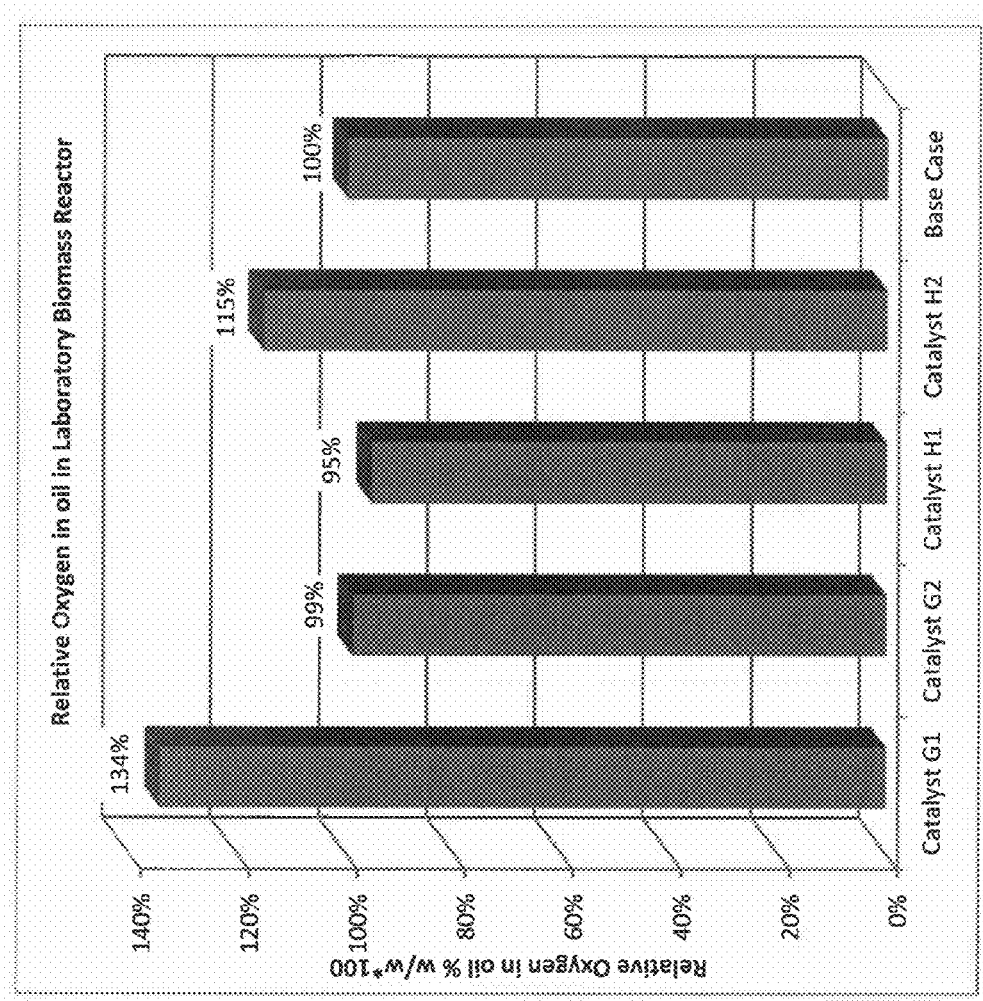
FIG. 18 is a plot showing relative oxygen in oil of bio-oils separately produced from the thermo-catalytic conversion of biomass in the presence of Catalysts G1, G2, H1, H2 and a Base Case.

FIG. 18 shows relative oxygen in oil for each of catalysts G1, G2, H1, H2, and Base Case, all relative to the oxygen in oil for the Base Case Catalyst. Catalysts G2 and H1 had lower relative oxygen in oil as compared to the Base Case Catalyst, and the relative oxygen in oil for Catalyst H2 was only slightly higher than that for the Base Case Catalyst.

Figure 19:
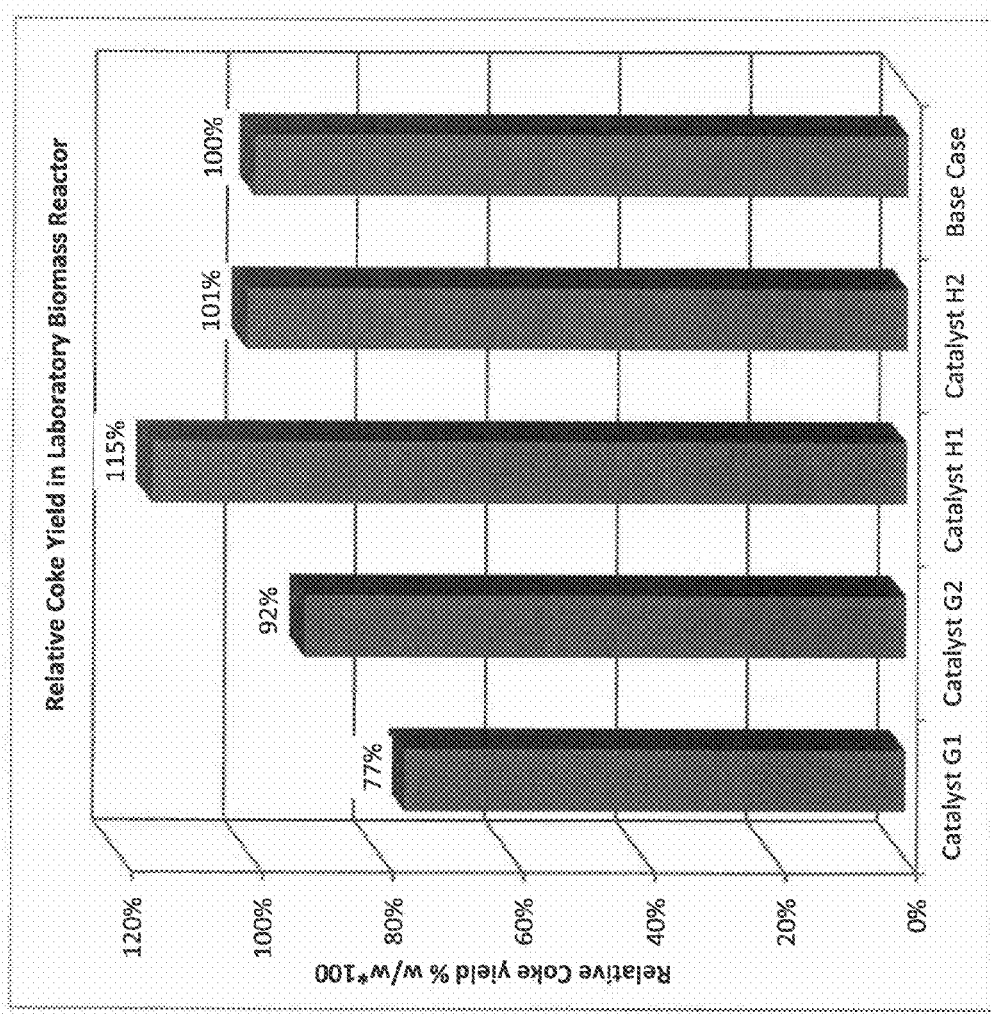
FIG. 19 is a plot showing relative coke yield of bio-oils separately produced from the thermo-catalytic conversion of biomass in the presence of Catalysts G1, G2, H1, H2 and a Base Case.

FIG. 19 shows relative coke for each of Catalysts G1, G2, H1, H2, and Base Case, all relative to the coke make for the Base Case Catalyst. Catalysts G1, G2 and H2 had similar or superior coke selectivity as compared to the Base Case Catalyst, with Catalyst H1 having only slightly higher coke make as compared to the Base Case Catalyst.

Figure 20:
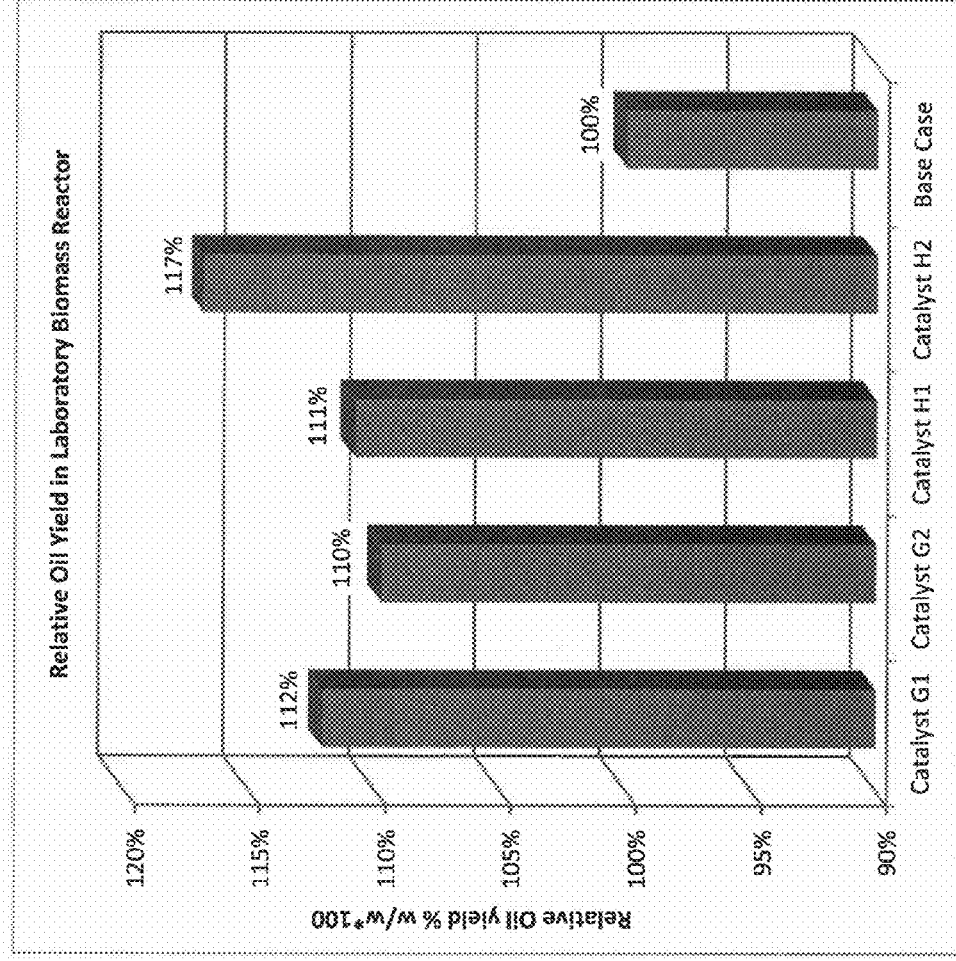
FIG. 20 is a plot showing relative oil yield of bio-oils separately produced from the thermo-catalytic conversion of biomass in the presence of Catalysts G1, G2, H1, H2 and a Base Case.

FIG. 20 shows relative oil yield for each of Catalysts G1, G2, H1, H2, and Base Case, all relative to the oil yield for the Base Case Catalyst. Each of the Catalysts G1, G2, H1, and H2 had much higher relative oil yield as compared to the oil yield of the Base Case Catalyst.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

Further, unless expressly stated otherwise, the term "about" as used herein is intended to include and take into account variations due to manufacturing tolerances and/or variabilities in process control.

Changes may be made in the construction and the operation of the various components, elements and assemblies described herein, and changes may be made in the steps or sequence of steps of the methods described herein without departing from the spirit and the scope of the invention as defined in the following claims.

What is claimed is:

1. A method of making a biomass conversion catalyst comprising:
    a) preparing an aqueous slurry comprising a phosphorous-promoted zeolite and a silica precursor, wherein the zeolite is selected from the group consisting of ZSM-5, mordenite, beta, ferrierite, zeolite-Y, and combinations thereof;
    b) spray drying said aqueous slurry at a pH equal to or less than about 2.7, thereby gelling said silica precursor and forming a biomass conversion catalyst in the form of particles;
    c) wet impregnating the biomass conversion catalyst with phosphorous; and
    d) drying the wet impregnated biomass conversion catalyst, forming a phosphorous-promoted biomass conversion catalyst.

2. The method of claim 1 wherein said aqueous slurry further comprises a clay; said zeolite is ZSM-5; and said silica precursor is at least one of silicic acid and polysilicic acid.

3. The method of claim 2 wherein said clay is kaolin, and said biomass conversion catalyst is free of or substantially free of amorphous alumina.

4. The method of claim 2 wherein said particles have: i) an average pore volume of pores ranging in diameter from about 80 to about 600 Å of at least about 0.025 cm$^3$/g, and ii) an average pore volume of pores ranging in diameter from about 20 to about 80 Å of no more than about 0.08 cm$^3$/g; wherein each of said average pore volumes in i) and ii) are obtained from the adsorption branch of the nitrogen isotherm, when measured per ASTM method D4222 at about 77° K, and discretized according to the BJH pore size distribution model.

5. A method of making a biomass conversion catalyst comprising:
- a) preparing an aqueous slurry comprising: (i) a phosphorous-promoted zeolite, wherein the zeolite is selected from the group consisting of ZSM-5, mordenite, beta, ferrierite, zeolite-Y, and combinations thereof, (ii) a silica precursor which is substantially sodium free, and (iii) a pore regulating agent selected from the group consisting of ionic pore regulating agents, nonionic pore regulating agents, and combinations thereof;
- b) spray drying said aqueous slurry at a pH equal to or less than about 2.7, thereby gelling said silica precursor and forming said biomass conversion catalyst into particles; wherein said particles have an average mesopore surface area (average MSA) less than or equal to about 50 m$^2$/g, and wherein said biomass conversion catalyst has a salt concentration less than about 0.1 times the mass of said silica; and
- c) promoting the biomass conversion catalyst with phosphorous.

6. The method of claim 5 wherein said aqueous slurry further comprises a clay; said zeolite is ZSM-5; said silica precursor is at least one of silicic acid and polysilicic acid; and wherein said biomass conversion catalyst is free of or substantially free of amorphous alumina.

7. The method of claim 5 wherein, prior to step a), a ZSM-5 material is treated with a phosphorous-containing compound to form a phosphorous promoted ZSM-5 which is used as said zeolite in said aqueous slurry.

8. The method of claim 5 wherein said particles have: i) an average pore volume of pores ranging in diameter from about 80 to about 600 Å of no more than about 0.020 cm$^3$/g, and ii) an average pore volume of pores ranging in diameter from about 20 to about 80 Å of no more than about 0.010 cm$^3$/g; wherein each of said average pore volumes in i) and ii) are obtained from the adsorption branch of the nitrogen isotherm, when measured per ASTM method D4222 at about 77° K, and discretized according to the BJH pore size distribution model.

9. The method of claim 5 wherein said aqueous slurry is spray dried in step b) at a pH equal to or less than about 1, thereby gelling said silica precursor and forming said biomass conversion catalyst into particles.

10. The method of claim 9 wherein said particles have: i) an average pore volume of pores ranging in diameter from about 80 to about 600 Å of at least about 0.01 cm$^3$/g, and ii) an average pore volume of pores ranging in diameter from about 20 to about 80 Å of no more than about 0.03 cm$^3$/g; wherein each of said average pore volumes in i) and ii) are obtained from the adsorption branch of the nitrogen isotherm, when measured per ASTM method D4222 at about 77° K, and discretized according to the BJH pore size distribution model.

11. The method of claim 9 wherein said aqueous slurry further comprises a clay; said zeolite is ZSM-5; and said silica precursor is at least one of silicic acid and polysilicic acid.

12. The method of claim 9 wherein, prior to step a), a ZSM-5 material is treated with a phosphorous-containing compound to form a phosphorous promoted ZSM-5 which is used as said zeolite in said aqueous slurry.

13. The method of claim 9 wherein following said spray drying step said biomass conversion catalyst is promoted with phosphorous.

* * * * *